United States Patent [19]
Niijima et al.

[11] Patent Number: 5,903,314
[45] Date of Patent: *May 11, 1999

[54] ELECTRICAL PROGRAM GUIDE SYSTEM AND METHOD

[75] Inventors: Makoto Niijima; Hiroaki Nakano; Yumie Sonoda, all of Tokyo; Yoshiaki Kumagai, Kanagawa; Junichi Nagahara, Tokyo; Tatsushi Nashida, Kanagawa; Hirofumi Tamori, Tokyo; Hiroyuki Hanaya, Saitama, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/590,945

[22] Filed: Jan. 24, 1996

[30] Foreign Application Priority Data

Feb. 6, 1995 [JP] Japan ................................ 7-018216
May 2, 1995 [JP] Japan ................................ 7-108462

[51] Int. Cl.$^6$ .............................. H04N 7/173; H04N 7/18
[52] U.S. Cl. ......................... 348/564; 348/565; 348/906; 348/567
[58] Field of Search .................................. 348/564, 555, 348/565, 567, 556, 569, 570, 6, 7, 10, 840, 731, 732, 906, 566, 568; H04N 7/173, 7/18

[56] References Cited

U.S. PATENT DOCUMENTS

| 4,855,833 | 8/1989 | Kageymana | 348/567 |
|---|---|---|---|
| 5,144,438 | 9/1992 | Kim | 348/567 |
| 5,231,494 | 7/1993 | Wachob | 348/10 |
| 5,317,403 | 5/1994 | Keenan | 348/731 |
| 5,398,074 | 3/1995 | Duffield et al. | 348/564 |
| 5,537,152 | 7/1996 | Ishikawa | 348/564 |
| 5,537,153 | 7/1996 | Shigihara | 348/564 |
| 5,633,683 | 5/1997 | Rosengren et al. | 348/385 |
| 5,635,989 | 6/1997 | Rothmuller | 348/563 |

FOREIGN PATENT DOCUMENTS

| 0413838A1 | 2/1991 | European Pat. Off. | H04N 5/445 |
|---|---|---|---|
| 0566092A2 | 10/1993 | European Pat. Off. | H04N 5/45 |
| 2220543 | 1/1990 | United Kingdom | H04N 5/45 |
| 2222048 | 2/1990 | United Kingdom | H04N 5/45 |
| WO9515646A1 | 6/1995 | WIPO | H04N 5/445 |

Primary Examiner—John K. Peng
Assistant Examiner—Linus H. Lo
Attorney, Agent, or Firm—Jay H. Maioli

[57] ABSTRACT

The invention provides an electrical program guide system and method by which a desired program can be rapidly selected directly from among a large number of programs with certainty. A program selection screen as a multi-screen is formed from nine reduced screens reduced to one third in the horizontal and vertical directions from screens of programs broadcast on different broadcasting channels. A plurality of such program selection screens are transmitted to a reception side. On the reception side, the program selection screens are stored into a virtual frame memory so that reduced screens of them may make a single virtual screen. From among the reduced screens of the virtual frame, desired 3×3 reduced screens are read out and displayed on a multi-screen of full motion. A viewer finds and directly selects a desired program from within the 3×3 reduced screens of full motion displayed as the multi-screen. The array of the reduced screens can be automatically changed, based on program enjoyment histories, so that a reduced screen of a program enjoyed frequently by the viewer is disposed at a position which facilitates selection by the viewer such as the upper left position of the screen. The array may be customized such that it is changed to an arbitrary array based on a desire of the viewer.

10 Claims, 31 Drawing Sheets

ORDINARY SCREEN
(= SCREEN OF PROGRAM)

(240×160 PICTURE ELEMENTS)×9

MULTISCREEN (= PROGRAM SELECTION SCREEN OR ARRAY OF REDUCED SCREENS)
REDUCED SCREEN OF 1/9 SIZE (240×160 PICTURE ELEMENTS)

(240×160 PICTURE ELEMENTS)×9×6

VIRTUAL SCREEN

REDUCED SCREEN OF 1/9 SIZE (240×160 PICTURE ELEMENTS)

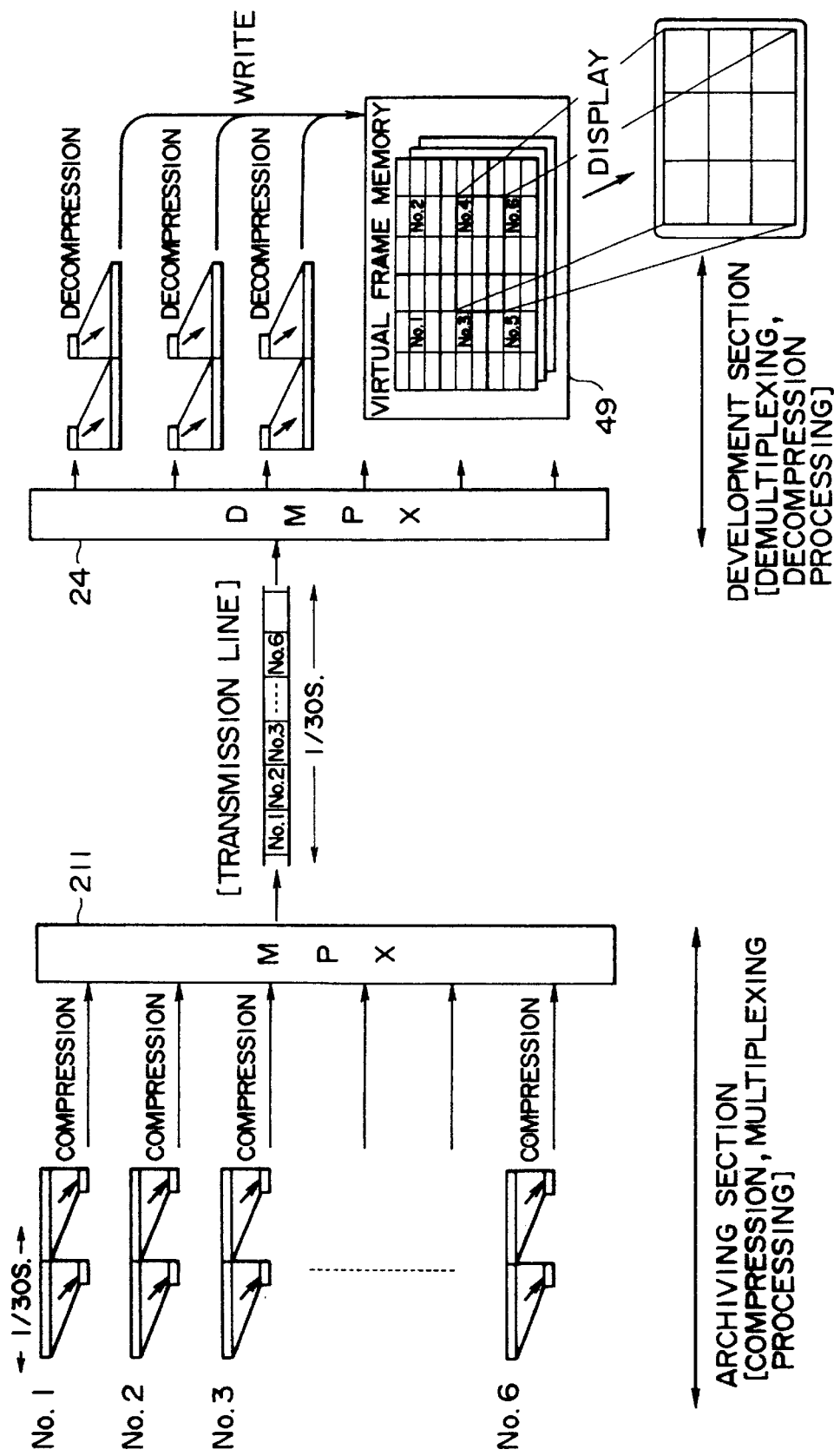

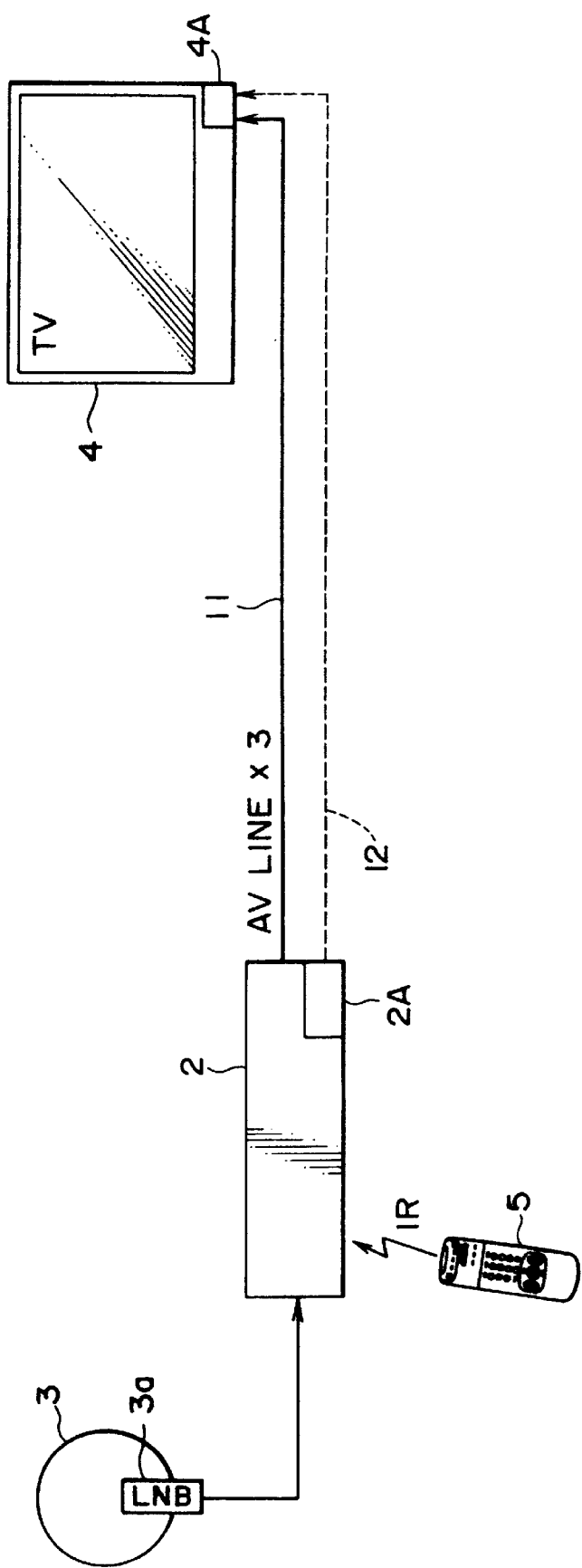

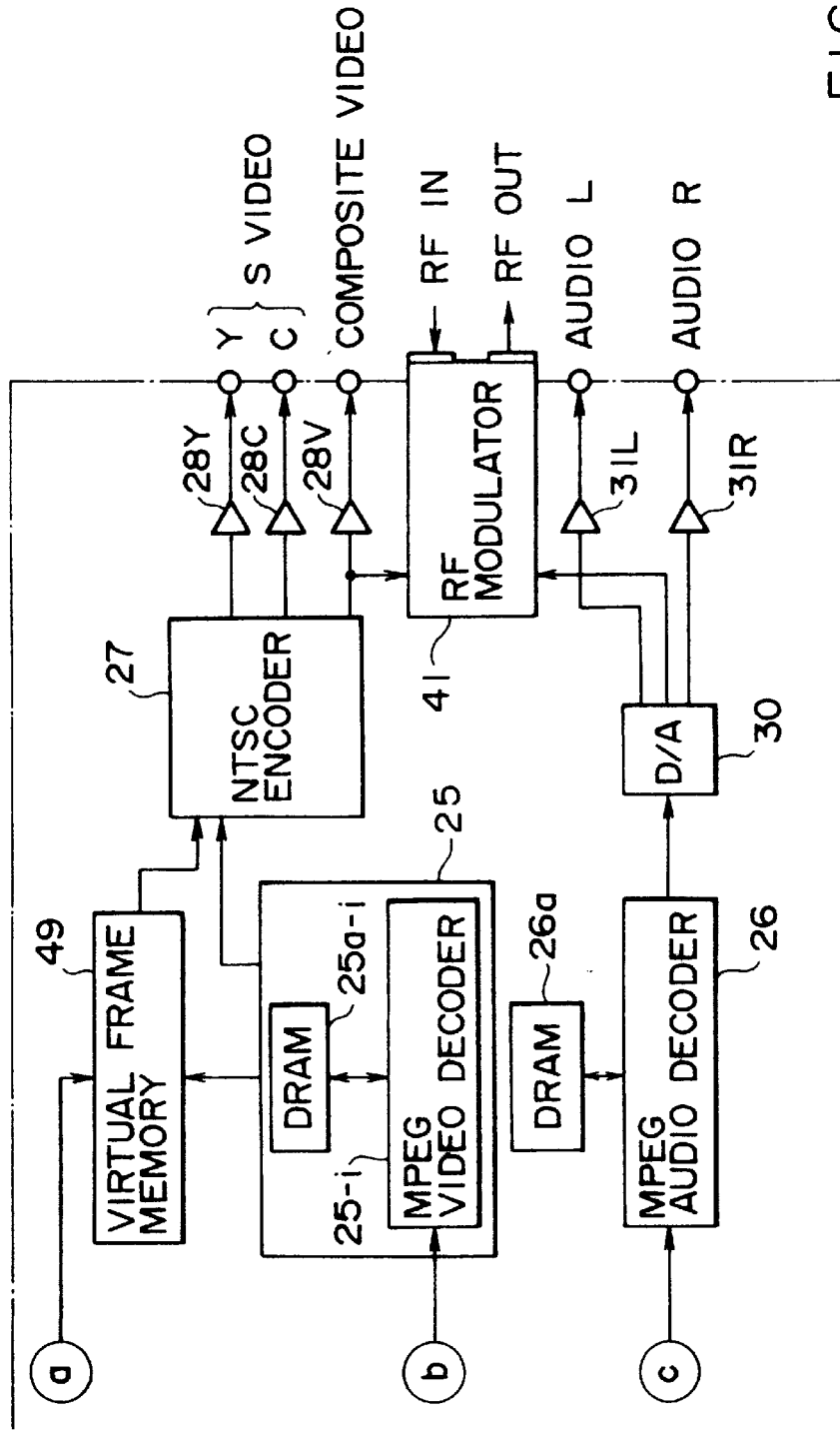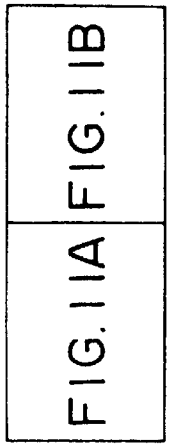

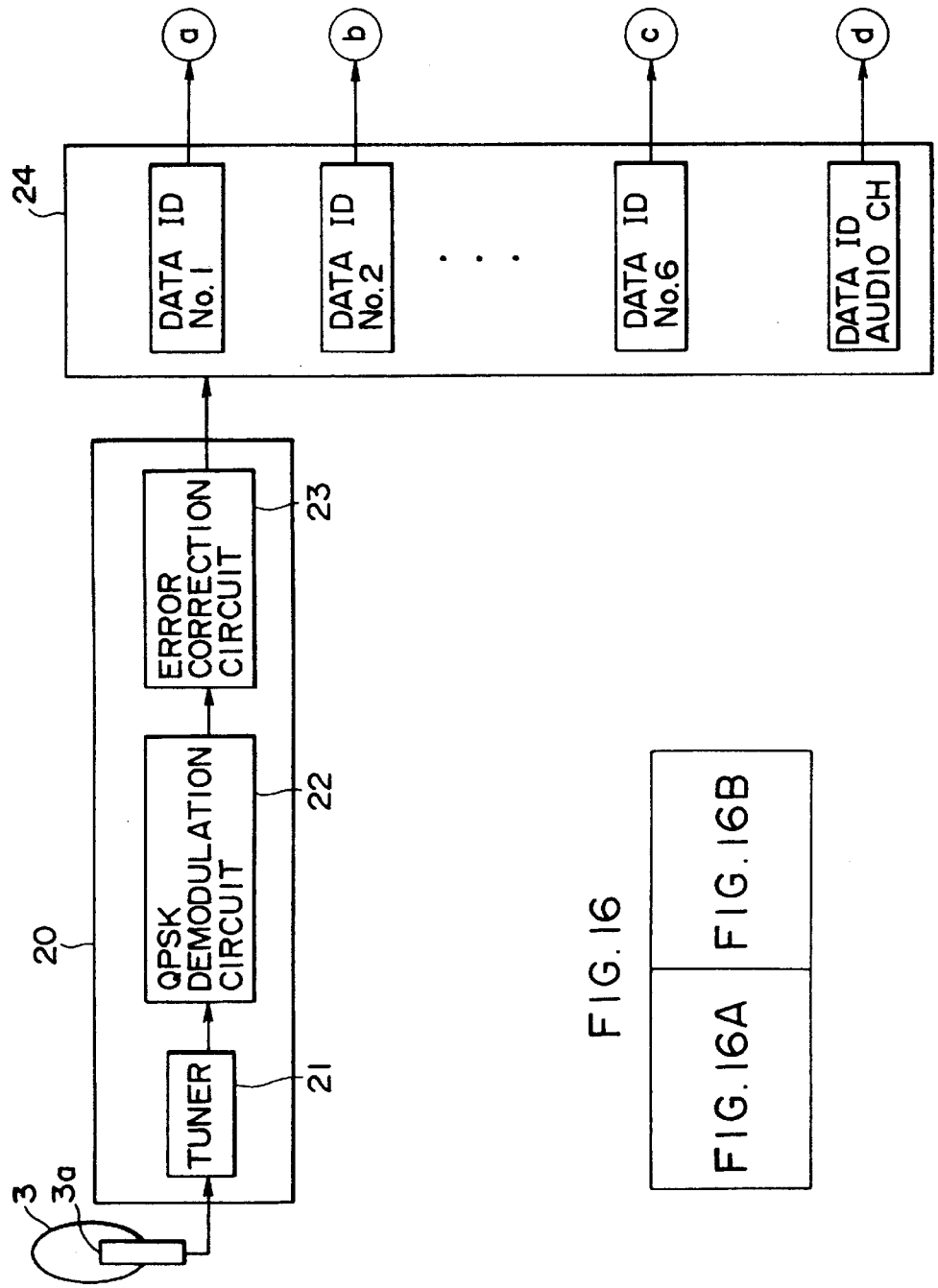

FIG. 23
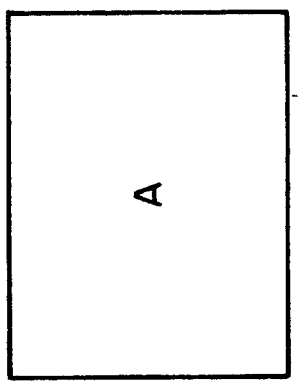
A
ORDINARY PROGRAM
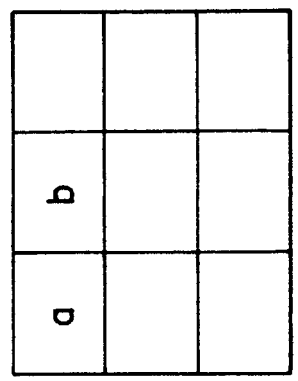
TRANSPONDER T1
REDUCED SCREEN (ARCHIVED DATA)
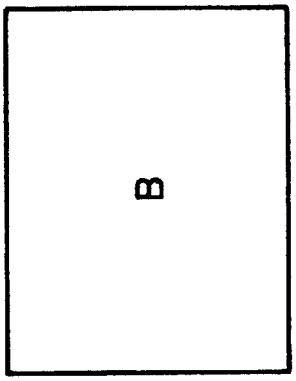
B
ORDINARY PROGRAM
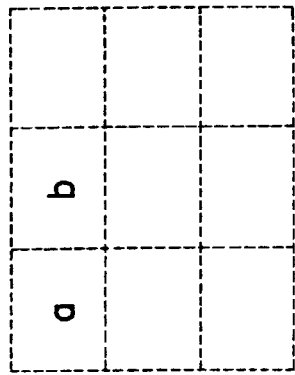
TRANSPONDER T2
REDUCED SCREEN (ARCHIVED DATA)

FIG. 25
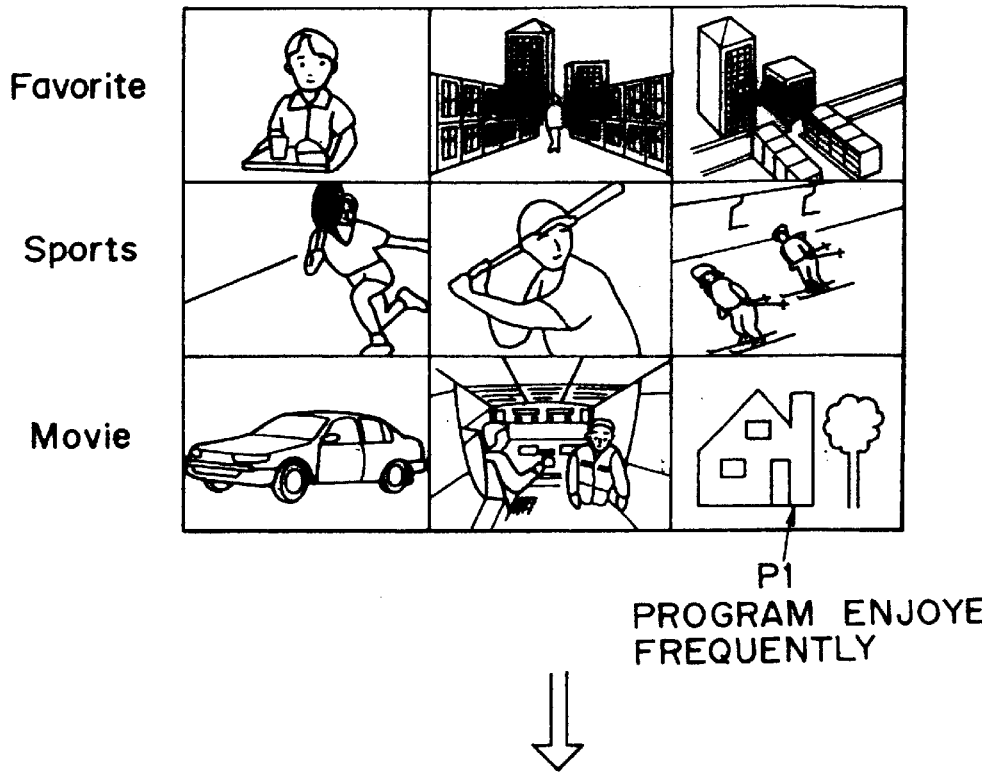
P1 PROGRAM ENJOYED FREQUENTLY
⇓
P1 PROGRAM ENJOYED FREQUETLY IS MOVED TO HIGHER ORDER
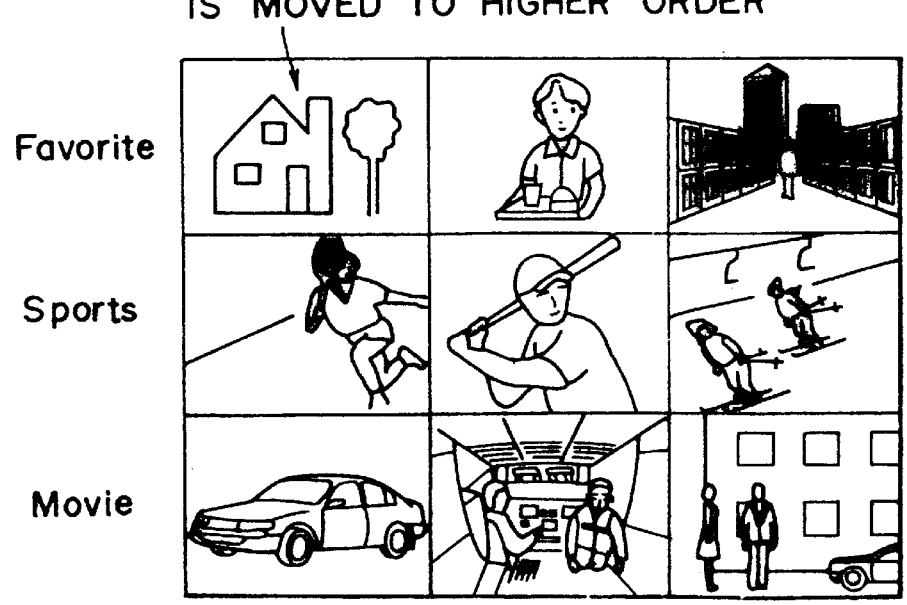

FIG. 26
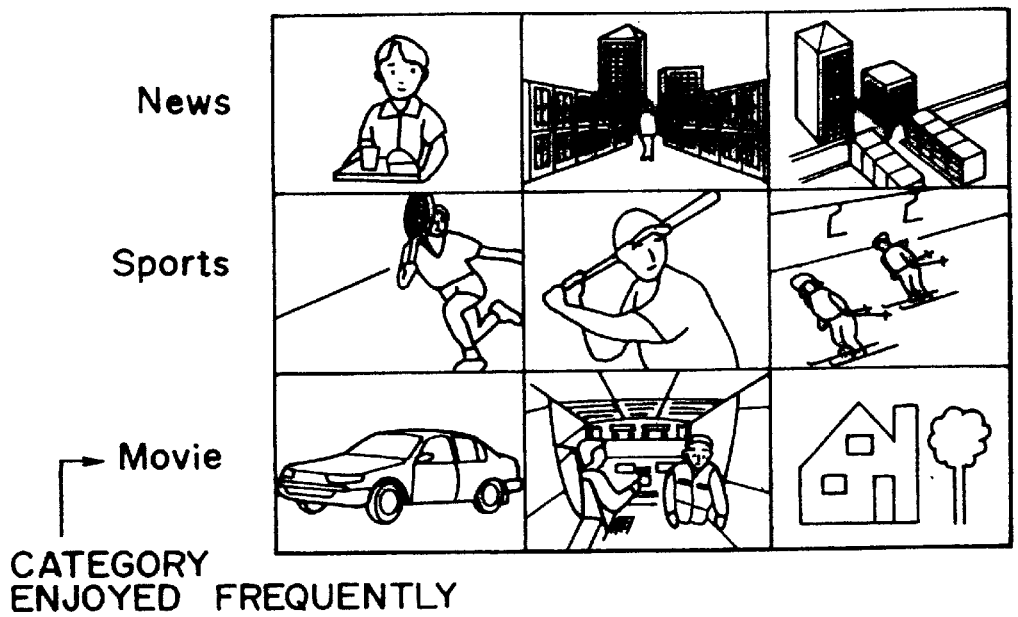
News
Sports
→ Movie
CATEGORY
ENJOYED FREQUENTLY
MOVED TO HIGHER ORDER
AS PREFERENCE DEGREE
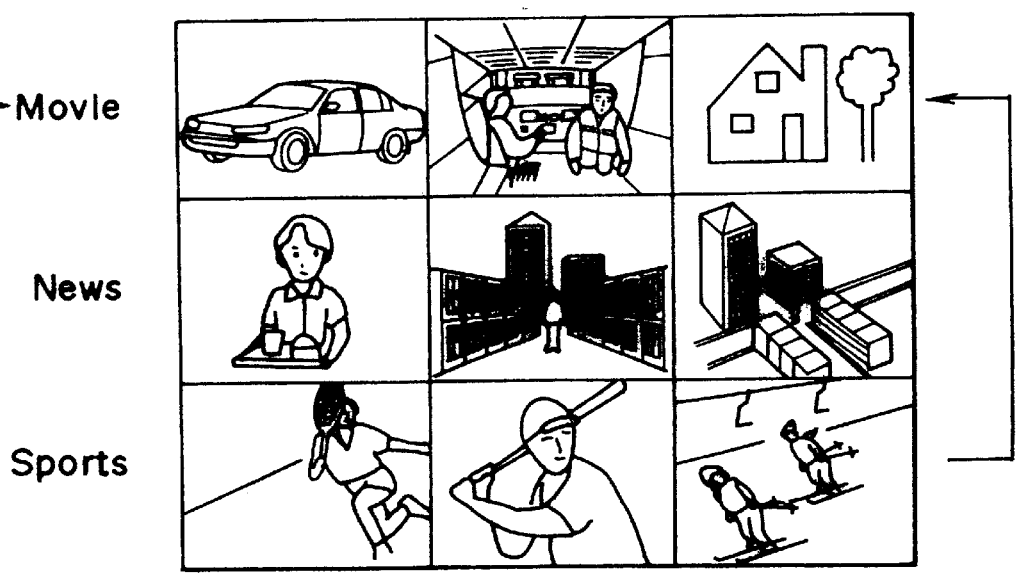
→ Movie
News
Sports

ELECTRICAL PROGRAM GUIDE SYSTEM AND METHOD

BACKGROUND OF THE INVENTION

This invention relates to an electrical program guide system and method wherein a plurality of program selection screens in each of which a plurality of reduced screens indicating the contents of programs of different broadcasting channels are arranged are transmitted and developed into a virtual screen to allow a desired program to be selected rapidly with certainty, intuitively and directly from among a large number of programs.

In recent years, the number of broadcasting channels has increased in a cable television (CATV) system or a digital direct satellite broadcasting system (DSS: Digital Satellite System, a trademark of Hughes Communications) in the United States of America applying a high efficiency coding technique such as the MPEG (Moving Picture Experts Group). As a result of an increase in the number of channels, for example, 150 to 200 broadcasting channels are now available, it is not easy to find a desired program from among the multitude of broadcasting channels. In general, to find a desired program, a broadcasting channel is first selected and the program of the selected broadcasting channel is actually confirmed. Then, if the program is not the desired one, another broadcasting channel is selected similarly. When the number of channels is comparatively small, the way of selection just described is not very inconvenient; however when the number of available channels is such a very great number as mentioned above, the way of selection will make the viewer feel cumbersome.

Thus, in order to allow a viewer to readily recognize the contents of programs being currently broadcast, a method of displaying images of the programs being currently broadcast on a so-called multi-screen which includes a plurality of reduced screens has been proposed and is disclosed in, for example, Japanese Patent Laid-Open Application No. Heisei 6-169448.

According to the method disclosed in the document just mentioned, a screen is formed as a multi-screen which is divided into 4×4 reduced screens, in each of which a reduced image of a screen of a program broadcast in a different broadcasting channel is displayed. Further, on each reduced screen, the number of the broadcasting channel which is broadcasting the program is displayed in a superimposed condition. Accordingly, the viewer can recognize, observing the reduced screens of the multi-screen, outlines of contents of the individual programs, and when the viewer wants to actually enjoy one of the programs, the viewer will manually operate a remote commander or a like device to input the number of the broadcasting channel of the program.

While such an increase in the number of broadcasting channels as described above is proceeding in the United States of America, a project of digital television broadcasting is proceeding also in Japan. If the project is realized, a large number of broadcasting channels are will be provided, and it will become impossible to present the programs of a large number of broadcasting channels with a mere 16 reduced screens.

Further, the positions of programs to be displayed on individual reduced screens of the multi-screen are fixed. Consequently, the image displaying method described above has a disadvantage that the array of programs of the broadcasting channels to be displayed on the individual reduced screens cannot be varied automatically in accordance with the history of program enjoyment or reduced screens cannot be disposed at arbitrary customized positions of the multi-screen in accordance with a will of the viewer. More specifically, in the prior art, it is impossible to dispose a reduced screen of a program enjoyed comparatively frequently, for example at the left upper position in the multi-screen.

SUMMARY OF THE INVENTION

It is an object of the present invention to provide an electrical program guide system and method by which a desired program can be selected rapidly with certainty, intuitively and directly from among a large number of programs.

It is another object of the present invention to provide an electrical program guide system and method wherein reduced screens can be re-arranged arbitrarily or re-arranged automatically at individual optimum positions in accordance with a program enjoyment history.

In order to attain the objects described above, according to an aspect of the present invention, there is provided a reception apparatus for receiving a program selection screen for selection of a plurality of programs of different broadcasting channels, comprising reception means for receiving a plurality of program selection screens in each of which reduced screens reduced from screens of the plurality of programs are arranged on a single screen, storage means for storing the plurality of program selection screens received by the reception means in a condition wherein the program selection screens are developed on a virtual screen which is greater in size than one of the program selection screens, and outputting means for reading out an array of a plurality of ones of the reduced screens from the virtual screen of the storage means and outputting the thus read out array of the reduced screens.

In the reception apparatus, a plurality of program selection screens received are stored in a condition wherein the program selection screens are developed on a virtual screen which is greater in size than one of the program selection screens, and an array of a plurality of ones of the reduced screens is read out from the virtual screen and outputted. Consequently, a user interface in which the large virtual screen is partially seen can be realized. As a result, a desired program can be selected rapidly with certainty, intuitively and directly from among a large number of programs displayed, for example, on a multi-screen of full motion.

The reception apparatus may further comprise array control means for arbitrarily changing an array of those of the reduced screens which are to be displayed. The array control means may read out the reduced screens from the storage means after re-arranging the reduced screens for individual categories of the programs. Where the reception apparatus comprises the array control means, it may further comprise array designation means for designating array positions of the storage means when the reduced screens are to be stored into the storage means or changing means for changing array positions of the reduced screens stored in the storage means.

In the reception apparatus, when a plurality of the program selection screens in each of which reduced screens reduced from screens of the plurality of programs are arranged on a single screen are received and stored in a condition wherein the program selection screens are developed on a virtual screen which is greater in size than one of the program selection screens and then an array of a plurality of ones of the reduced screens is read out from the virtual screen and outputted, the reduced screens can be re-arranged into an arbitrary array based on a desire of a viewer.

Consequently, a desired program can be selected rapidly with certainty, intuitively and directly from among a large number of programs displayed in a customized array, for example, on a multi-screen of full motion.

Where the reception apparatus comprises the changing means, preferably the changing means changes the array positions of the reduced screens stored in the storage means in accordance with enjoyment histories of the corresponding programs. With the reception apparatus, the reduced screens can be automatically re-arranged to optimum positions based on the enjoyment histories of a viewer. Consequently, a program which is enjoyed with a high frequency can be found out and selected rapidly and readily.

According to another aspect of the present invention, there is provided a reception method for receiving a program selection screen for selection of a plurality of programs of different broadcasting channels, comprising the steps of receiving a plurality of program selection screens in each of which reduced screens reduced from screens of the plurality of programs are arranged on a single screen, storing the received plurality of program selection screens in a condition wherein the program selection screens are developed on a virtual screen which is greater than one of the program selection screens, and reading out an array of a plurality of ones of the reduced screens from the virtual screen and outputting the thus read out array of the reduced screens.

In the reception method, a plurality of program selection screens received are stored in a condition wherein the program selection screens are developed on a virtual screen which is greater in size than one of the program selection screens, and an array of a plurality of ones of the reduced screens is read out from the virtual screen and outputted. Consequently, a user interface in which the large virtual screen is partially seen can be realized. As a result, a desired program can be selected rapidly with certainty, intuitively and directly from among a large number of programs displayed, for example, on a multi-screen of full motion.

According to a further aspect of the present invention, there is provided a broadcasting system wherein a program selection screen for selection of a plurality of programs of different broadcasting channels is transmitted from a transmission apparatus and received by a reception apparatus, comprising transmission means provided in the transmission apparatus for multiplexing and transmitting a plurality of program selection screens in each of which reduced screens reduced from screens of the plurality of programs are arranged on a single screen, reception means provided in the reception apparatus for receiving the plurality of program selection screens, storage means provided in the reception apparatus for storing the plurality of program selection screens received by the reception means in a condition wherein the program selection screens are developed on a virtual screen which is greater in size than one of the program selection screens, and outputting means provided in the reception means for reading out an array of a plurality of ones of the reduced screens from the virtual screen of the storage means and outputting the thus read out array of the reduced screens.

In the broadcasting system, a plurality of program selection screens received are stored in a condition wherein the program selection screens are developed on a virtual screen which is greater in size than one of the program selection screens, and an array of a plurality of ones of the reduced screens is read out from the virtual screen and outputted. Consequently, a user interface in the large virtual screen is partially seen can be realized. As a result, a desired program can be selected rapidly with certainty, intuitively and directly from among a large number of programs displayed, for example, on a multi-screen of full motion.

According to a still further aspect of the present invention, there is provided a broadcasting method wherein a program selection screen for selection of a plurality of programs of different broadcasting channels is transmitted from a transmission apparatus and received by a reception apparatus, comprising the steps of multiplexing and transmitting, by the transmission apparatus, a plurality of program selection screens in each of which reduced screens reduced from screens of the plurality of programs are arranged on a single screen, receiving, by the reception apparatus, the plurality of program selection screens, storing, by the reception apparatus, the received plurality of program selection screens in a condition wherein the program selection screens are developed on a virtual screen which is greater than one of the program selection screens, and reading out, by the reception apparatus, an array of a plurality of ones of the reduced screens from the virtual screen and outputting the thus read out array of the reduced screens.

In the broadcasting method, a plurality of program selection screens received are stored in a condition wherein the program selection screens are developed on a virtual screen which is greater in size than one of the program selection screens, and an array of a plurality of ones of the reduced screens is read out from the virtual screen and outputted. Consequently, a user interface in the large virtual screen is partially seen can be realized. As a result, a desired program can be selected rapidly with certainty, intuitively and directly from among a large number of programs displayed, for example, on a multi-screen of full motion.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagrammatic view illustrating archiving processing;

FIG. 10 is a schematic view showing an electric connection condition of the apparatus of FIG. 8;

FIG. 23 is a diagrammatic view illustrating transmission of ordinary data using a transponder different from another transponder from which archived data are transmitted;

FIG. 25 is a schematic view illustrating a manner wherein a reduced screen of a program which is enjoyed frequently is shifted to the left end of the uppermost row of the virtual frame;

FIG. 26 is a schematic view illustrating a manner wherein reduced screens of programs which belong to a category enjoyed frequently are shifted to the uppermost row of the virtual frame;

DESCRIPTION OF THE PREFERRED EMBODIMENTS

Before preferred embodiments of the present invention are described, in order to clearly indicate the corresponding relationship between different elements of the present invention recited in the appended claims and the preferred embodiments of the present invention hereinafter described, the characteristics of the present invention will be described in connection with the elements with corresponding elements of the embodiments added in parentheses.

Figure 16B:
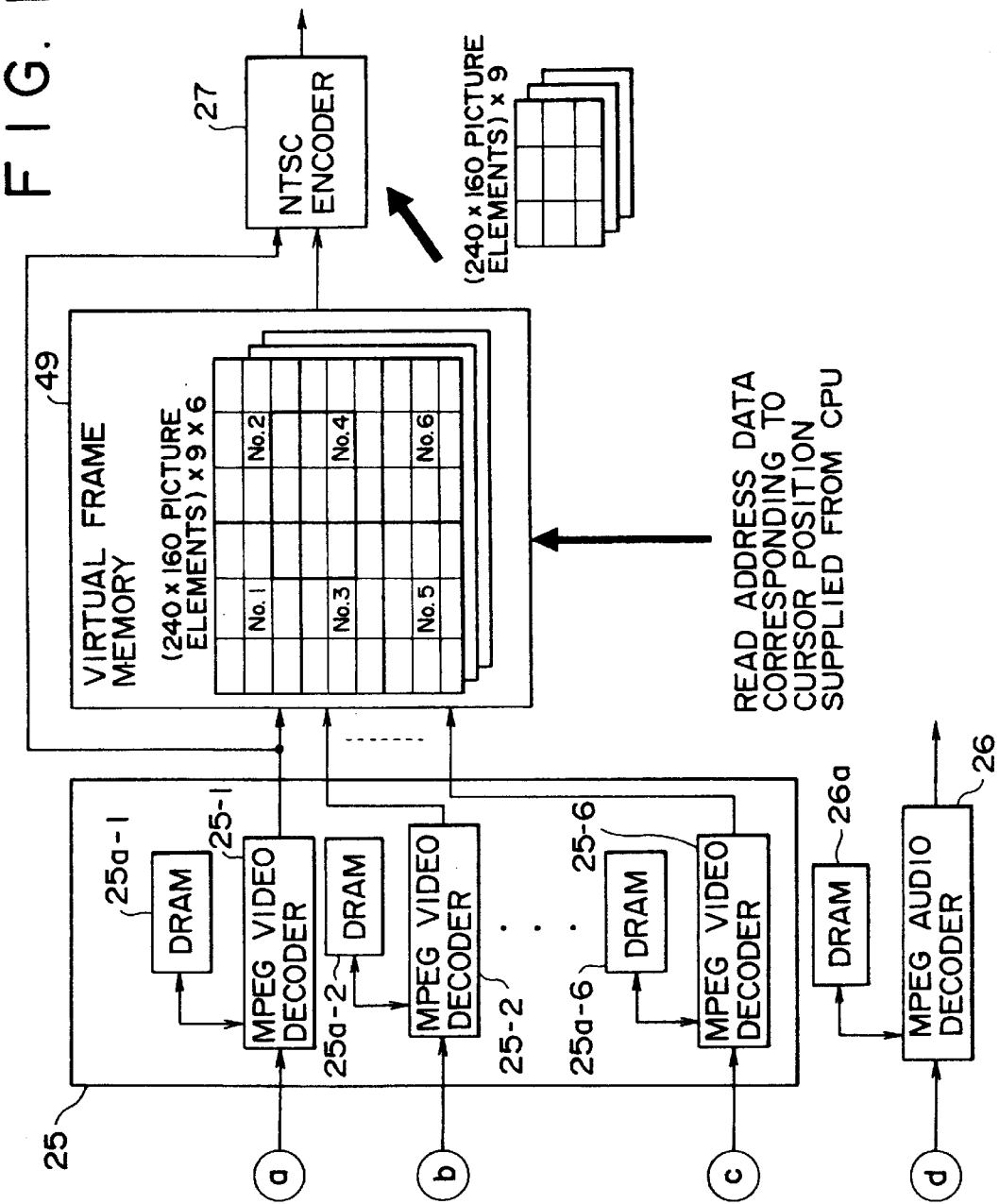
FIG. 16 is a block diagram illustrating operation of the arrangement shown in FIG. 10.

According to the present invention, a reception apparatus includes reception means (for example, a front end circuit 20, a demultiplexer 24 and a multi-channel real time decoder 25 of FIG. 16) for receiving a plurality of program selection screens in each of which reduced screens reduced from screens of a plurality of programs are arranged on a single screen, storage means (for example, a virtual frame memory 49 of FIG. 16) for storing the plurality of program selection screens received by the reception means in a condition wherein the program selection screens are developed on a virtual screen which is greater in size than one of the program selection screens, and outputting means (for example, a CPU 29 of FIG. 11) for reading out an array of a plurality of ones of the reduced screens from the virtual screen of the storage means and outputting the thus read out array of the reduced screens.

According to the present invention, the reception apparatus further includes display means (for example, a monitor apparatus 4 of FIG. 9) for displaying a program selection screen formed from the array of the plurality of ones of the program selection screens outputted from the outputting means.

According to the present invention, the reception apparatus further includes designation means (for example, a select button switch 131 of FIG. 12) for designating an area of the virtual screen of the storage means from within which the outputting means is read out to the reduced screens.

According to the present invention, the reception apparatus further includes array control means (for example, the CPU 29 of FIG. 11) for reading out the reduced screens from the storage means after re-arranging the reduced screens for individual categories of the programs.

According to the present invention, the reception apparatus further includes changing means (for example, the CPU 29 of FIG. 11) for changing array positions of the reduced screens stored in the storage means.

According to the present invention, a broadcasting system includes transmission means (for example, all elements of FIG. 6) provided in a transmission apparatus for transmitting a plurality of program selection screens in each of which reduced screens reduced from screens of the plurality of programs are arranged on a single screen, reception means (for example, the front end circuit 20, the demultiplexer 24 and the multi-channel real time decoder 25 of FIG. 16) provided in a reception apparatus for receiving the plurality of program selection screens, storage means (for example, the virtual frame memory 49 of FIG. 16) provided in the reception apparatus for storing the plurality of program selection screens received by the reception means in a condition wherein the program selection screens are developed on a virtual screen which is greater in size than one of the program selection screens, and outputting means (for example, the CPU 29 of FIG. 11) provided in the reception means for reading out an array of a plurality of ones of the reduced screens from the virtual screen of the storage means and outputting the thus read out array of the reduced screens.

It is to be noted that naturally the present invention should not be limited to the specific means described above.

Figure 1A:
FIGS. 1A to 1D are diagrammatic views illustrating definition of several terms used for description of the present invention.

FIGS. 1A to 1D illustrate definitions of several terms used in the present specification. FIG. 1A shows an ordinary screen (screen of a program) which signifies a screen on which an original image is displayed in full motion of the frame rate of 30 frames/second (30 fps) in the full size (720×480 picture elements).

Figure 1B:

FIG. 1B shows a multi-screen (program selection screen or array of reduced screens) which signifies a screen on which nine reduced screens of the ⅑ frame size (240×160 picture elements) are arranged in a 3×3 matrix. Each of the reduced screens is a screen displayed in full motion (30 fps).

Figure 1C:
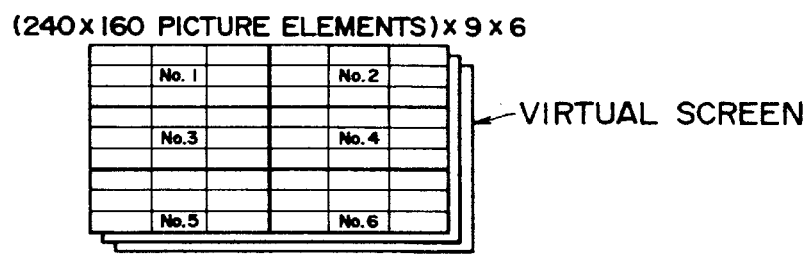

FIG. 1C shows a virtual screen which is an imaginary array screen on which six multi-screens of No. 1 to No. 6 are arranged in a 2×3 matrix. The virtual screen is successively written into a virtual frame memory at timings which satisfy the frame rate of 30 fps. Each reduced screen has the 1/9 frame size (240×160 picture elements) and is written so that it may be displayed in full motion (30 fps).

Figure 1D:
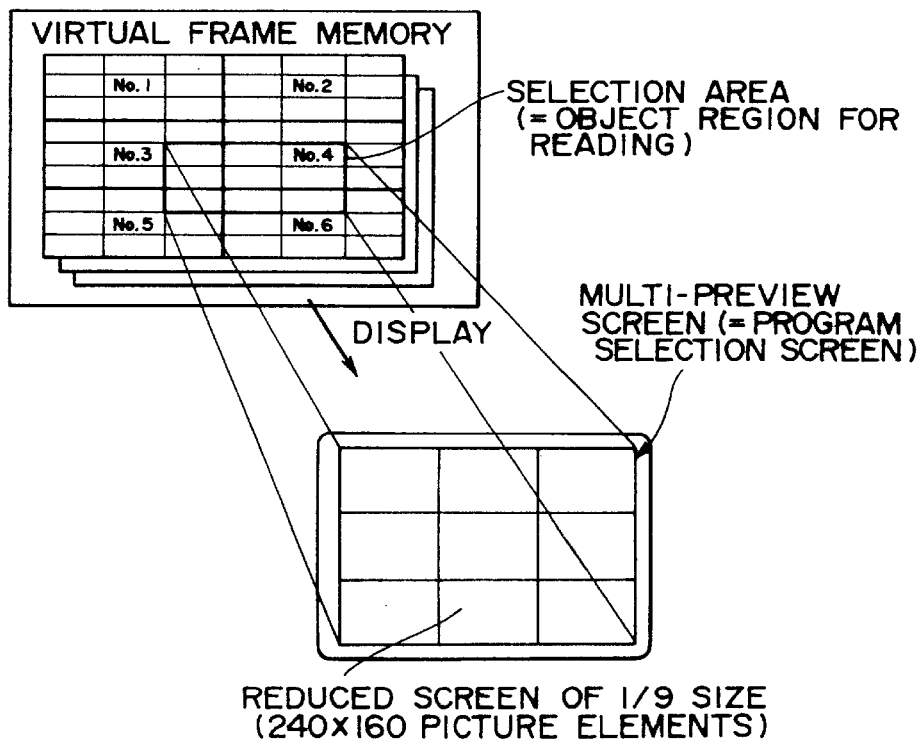

FIG. 1D shows a selection area (area from which data are to be read out) for selecting a multi-screen to be read out from within a virtual screen written in the virtual frame memory in response to a cursor moving operation. The selection area is moved upwardly or downwardly or leftwardly or rightwardly as the cursor moves. When reduced screens are to be displayed in units of a program category or the like, the corresponding reduced screens in the virtual screen are re-arranged on a predetermined child screen.

When an image selected with the selection area is displayed on a monitor apparatus, a multi-preview screen (program selection screen) is displayed. The multi-preview screen is a multi-screen read out from within the virtual screen written in the virtual frame memory in response to a cursor moving operation and displayed on the monitor apparatus. Each of the reduced screens of the multi-preview screen is displayed in full motion (30 fps) in the 1/9 frame size (240×160 picture elements).

Prior to the description of the preferred embodiments of the present invention, archiving processing will be described with reference to FIG. 2.

In particular, in the present invention, a plurality of (nine in the embodiments described below) screens of different programs are individually reduced (compressed) by thinning out (sampling) processing so that each of them includes a number of picture elements equal to one third that of the original screen in the vertical direction and the horizontal direction. Consequently, nine reduced screens each reduced to one ninth in area are produced. Then, the nine reduced screens are disposed at different positions of a multi-screen which is divided into 3×3 areas (reduced screens). The multi-screens of No. 1 to No. 6, each of which corresponds to one screen (one broadcasting channel), are produced in this manner. Then, as seen in FIG. 2, the six multi-screens of No. 1 to No. 6 are individually compressed by the MPEG system and then multiplexed by a multiplexer 211 so that they may be transmitted by one transmission channel. In the present specification, the compression and multiplexing processing is referred to as archiving processing.

The data multiplexed into data of one transmission channel by the multiplexer 211 are transmitted to the reception side via a transmission line formed from an artificial satellite, a cable, or a like element.

On the reception side, the data of one transmission channel transmitted thereto via the transmission line are demultiplexed by a demultiplexer 24 so that data of six original broadcasting channels (data of the multi-screens of No. 1 to No. 6 each having nine reduced screens) are separated.

Then, the thus demultiplexed data of the multi-screens of No. 1 to No. 6 (data of the program selection screens) are decompressed (decoded) by the MPEG system and stored into a virtual frame memory 49 so that they may construct a large virtual screen.

Then, a region of arbitrary 3×3 reduced screens of the virtual screen is selected suitably and then outputted and displayed.

Figure 3:
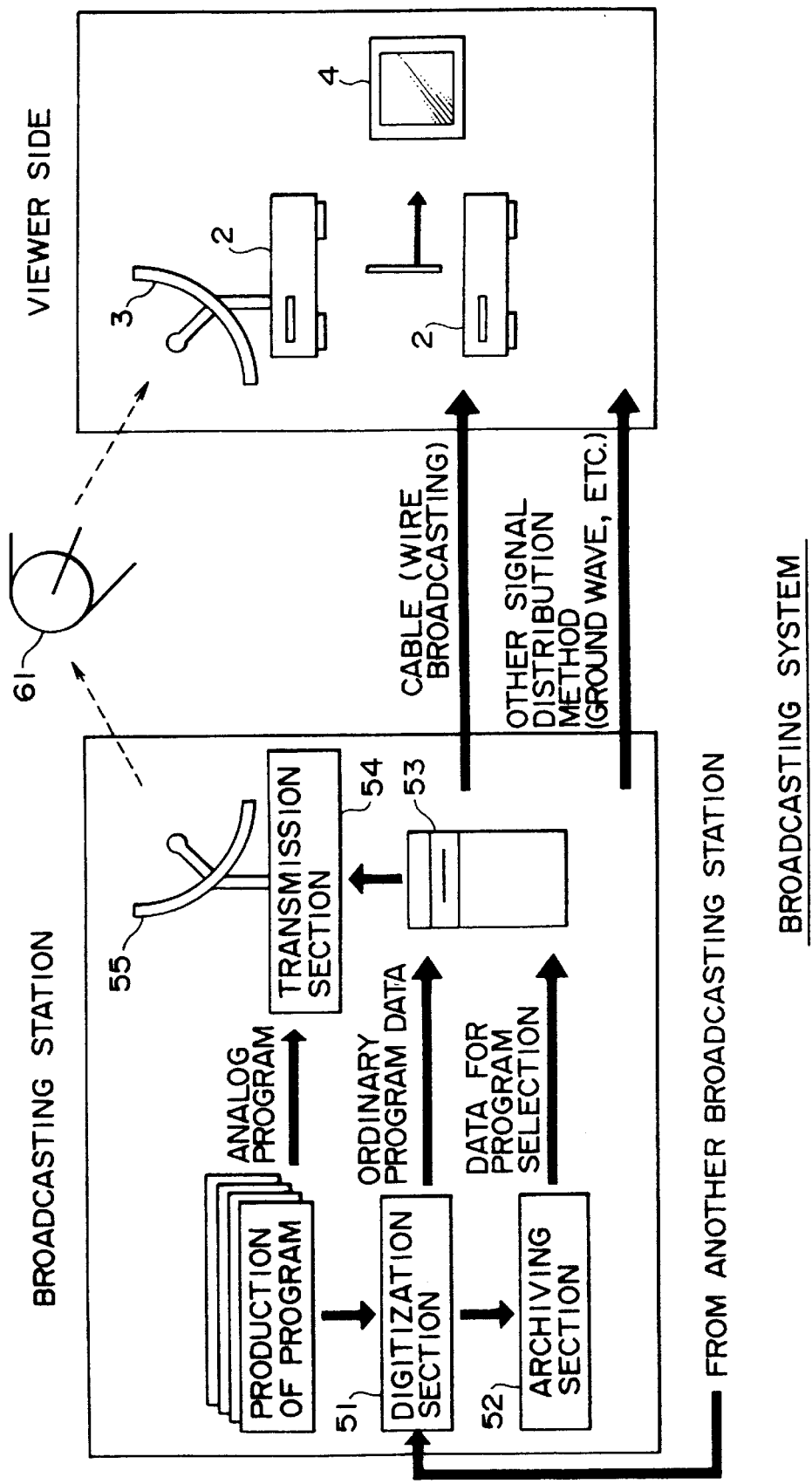
FIG. 3 is a diagrammatic view showing a broadcasting system to which the present invention is applied.

FIG. 3 shows a broadcasting system to which the present invention is applied. Referring to FIG. 3, a broadcasting station performs broadcasting of a program of, for example, the DSS. In particular, in the broadcasting station, a program or a plurality of programs (analog video and audio signals) of a broadcasting channel or different broadcasting channels are produced and supplied to a digitization section 51. Also programs of other broadcasting stations are supplied to the digitization section 51. The digitization section 51 digitizes the video and audio signals constructing the received programs and outputs the digitized video and audio signals to an archiving section 52.

The archiving section 52 receives, in addition to the programs from the digitization section 51, a digitized program or a plurality of digitized programs (digitized video and audio signals) of a broadcasting channel or different broadcasting channels from another station or stations. The archiving section 52 produces data for program selection (data for a program selection screen) representative of the contents of a plurality of programs of different channels inputted thereto for the individual channels. In particular, the archiving section 52 reduces the screens (images) of a plurality of channels inputted thereto and forms an image of a multi-screen with nine reduced screens. Then, for example, programs of nine broadcasting channels are combined into a multi-screen of one broadcasting channel.

Since data for program selection (reduced screens) are produced in this manner using programs broadcast normally as they are, the labor for production of a program for program selection independent of programs broadcast normally can be eliminated.

It is to be noted that it is assumed here that the archiving section 52 produces, for a program of each channel, a program of a screen reduced, for example, to one third in each of the vertical direction and the horizontal direction from that of the screen of the program (accordingly, in terms of the area, a screen reduced to one ninth that of the program of the broadcasting channel). Accordingly, in this instance, on the viewer side, reduced screens of programs of nine broadcasting channels can be displayed at a time on one screen.

Further, the archiving section 52 transmits audio signals of the programs of the individual child screens of the multi-screen (programs received from the digitization section 51 and the other broadcasting stations) together with the reduced screens.

Then, the archiving section 52 compresses the data by the MPEG system.

The archiving section 52 produces a plurality of (for example, 6) such multi-screens (program selection screens) (in other words, reduced screens totalling 54 (=6×9) programs are produced). Then, the data of the six multi-screens are combined (archived) into data of one transmission channel. Here, data of a plurality of program selection screens outputted from the archiving section 52 and including a combination of programs of a plurality of broadcasting channels into data of one broadcasting channel may be hereinafter referred to as archived data (the terminology "archive" is a computer terminology signifying to combine data of a plurality of files into one file).

A video server 53 receives the archived data outputted from the archiving section 52 and further receives programs of the plurality of broadcasting channels digitized by the digitization section 51 and compressed by the MPEG system (details will be hereinafter described with reference to FIG. 6).

The video server 53 stores the received data once and supplies them to a transmission section 54.

The transmission section 54 performs error correction processing, modulation (for example, QPSK modulation or the like) processing and other necessary processing (for example, encipherment processing, multiplexing processing, up conversion and so forth) for the data received from the video server 53. Then, a signal obtained as a result of the processing is transmitted to an artificial satellite (BS (broadcasting satellite) or CS (communication satellite)) 61 from a parabola antenna 55 and then transmitted to the viewer side from the artificial satellite 61. In other words, from the transmission section 54, the archived data of the program selection screen are transmitted together with the programs of the plurality of broadcasting channels to the viewer side via the artificial satellite 61. Accordingly, when the screen of each program is considered to be a screen of the full size, the screens of the full size and the reduced screens obtained by reduction of the screens of the full size are transmitted simultaneously from the broadcasting station.

It is to be noted that, while the programs of the plurality of broadcasting channels and the archived data are transmitted to the viewer side via the artificial satellite 61, they may otherwise be transmitted to the viewer side from the video server 53 via a wire transmission line such as a cable or in the form of a ground wave or by some other suitable signal distribution method. Further, the programs of the plurality of channels and the archived data may be transmitted not via a single transmission line but via a plurality of transmission lines to the viewer side (for example, the programs of the plurality of broadcasting channels may be transmitted via the artificial satellite 61 while the archived data are transmitted via a cable).

Furthermore, although the programs of the plurality of broadcasting channels (data of ordinary programs) are transmitted after being digitized by the digitization section 51, they may otherwise be supplied to the transmission section 54 while each of them remains in the form of an analog signal (analog program) so that they may be transmitted together with the archived data transmitted thereto from the video server 53.

On the viewer side, the data transmitted from the broadcasting station via the artificial satellite 61 (programs of the plurality of broadcasting channels and archived data) are received by a parabola antenna 3 and supplied to a receiver (set top box) 2.

The receiver 2 performs the necessary processing to the data from the parabola antenna 3, and a video signal from the receiver 2 is supplied to and displayed on a monitor apparatus 4 which may be, for example, a television receiver while an audio signal is supplied to and outputted as sound from a loudspeaker (not shown). In particular, when the receiver 2 is set so that a particular broadcasting channel is selected, a program of the particular broadcasting channel is displayed on the monitor apparatus 4. On the other hand, when archive data are selected the reduced screens of programs of a predetermined number of broadcasting channels (in the present embodiment, nine channels as described hereinabove) from among a plurality of reduced screens are simultaneously displayed on the monitor apparatus 4. Accordingly, in this instance, the viewer can observe the program selection screen and recognize the contents of the programs of the channels being currently broadcast (details will be hereinafter described). The screen for program selection may be hereinafter referred to as preview screen.

It is to be noted that, when data are transmitted from the broadcasting station via a cable or the like, they are directly received by the receiver 2. Further, when data are transmitted via a ground wave or the like from the broadcasting station, they are received by an antenna for ground waves not shown and then supplied to the receiver 2. Further, while two receivers 2 are shown in FIG. 3, data transmitted via the artificial satellite 61 or data transmitted via a cable or by way of a ground wave can be received by only one such receiver 2.

Figure 4:
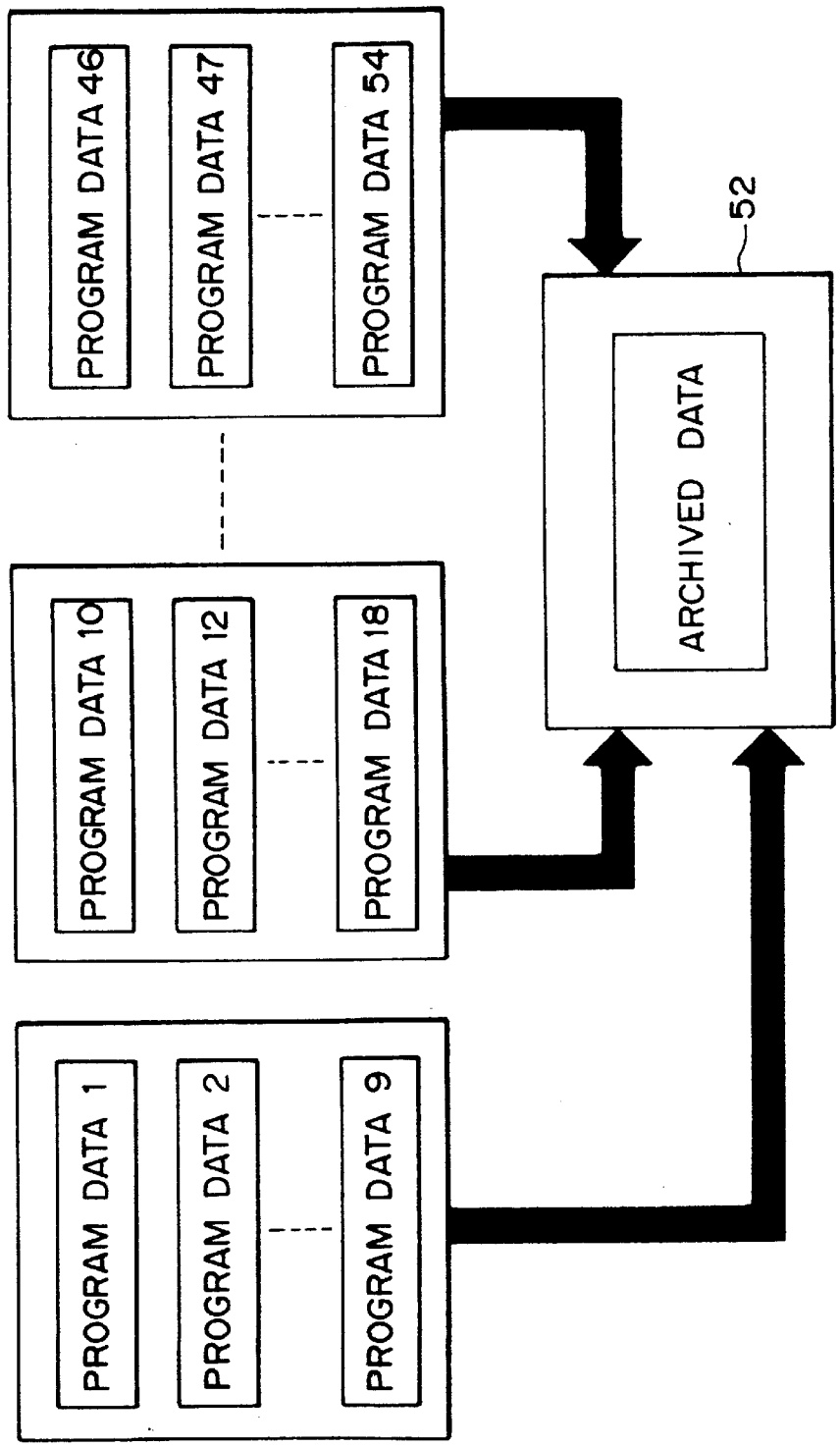
FIG. 4 is a diagrammatic view illustrating a manner in which archived data are produced.

FIG. 4 illustrates a manner in which archive data are produced by the archiving section 52. As seen from FIG. 4, the archiving section 52 reduces nine screens (images) of programs of broadcasting channels to produce a single multi-screen. Data of the single multi-screen can be handled, on the viewer side, as data of a broadcasting channel or independent data for program selection. Then, the archiving section 52 produces six such multi-screens and combines them as data of one transmission channel (archived data).

It is to be noted that the program data illustrated in FIG. 4 include reduced screen data as well as audio signals of the individual broadcasting channels as described hereinabove.

Further, the archiving section 52 not only can produce archived data from a plurality of reduced screens of programs of different broadcasting channels and output the archived data to the video server 53, but also can produce archived data from such reduced screens and output the archive data to the video server 53 after the reduced screens are re-arranged into a predetermined array condition such that, for example, they are arranged for individual categories of programs.

Figure 5:
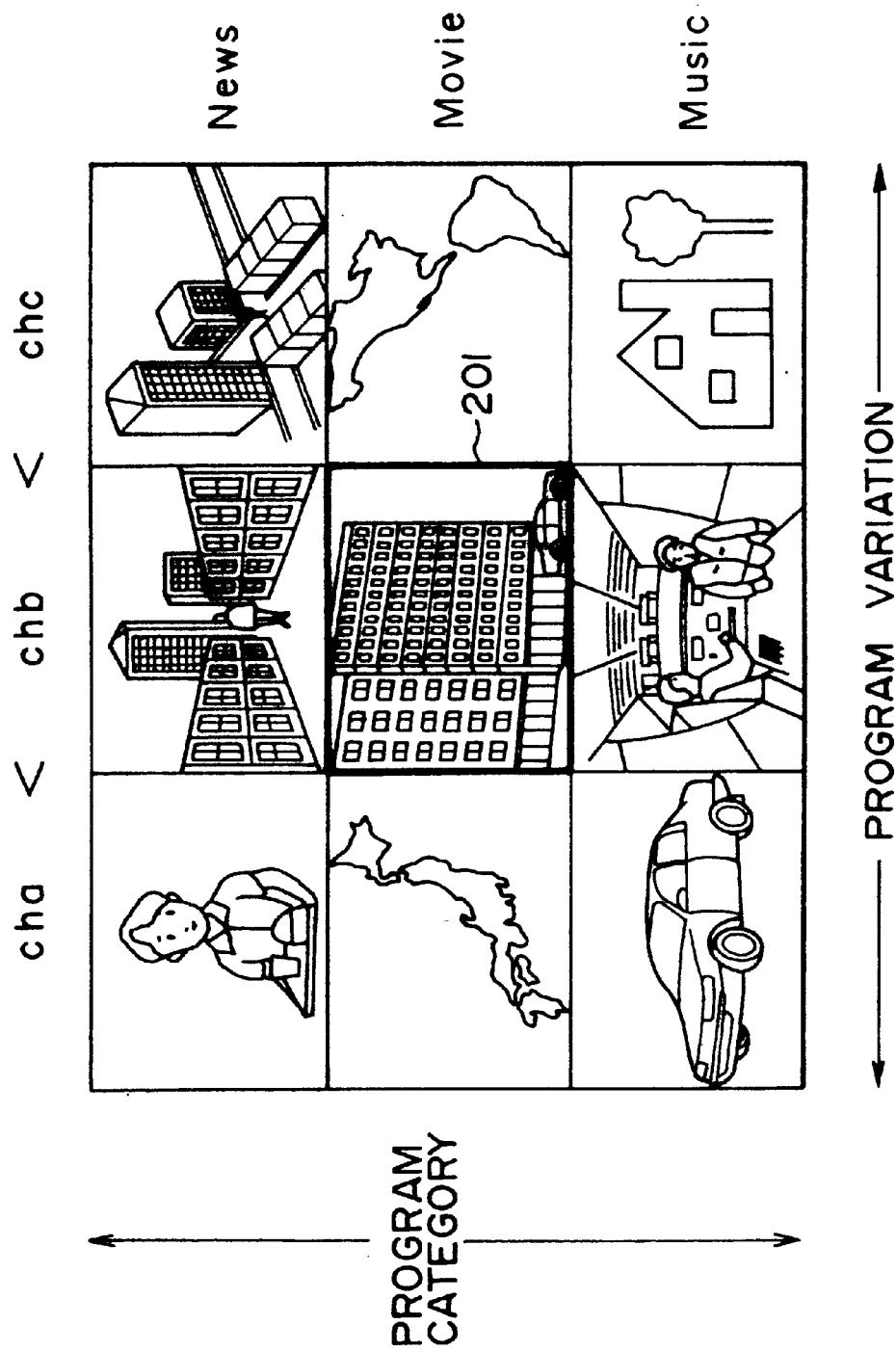
FIG. 5 is a schematic view illustrating a manner of arrangement of reduced screens.

In particular, for example, reduced screens of different categories of programs may be arranged in the vertical direction while reduced screens of the same categories of programs are arranged in the horizontal direction as seen in FIG. 5. More particularly, for example, reduced screens of news programs are arranged in the first horizontal row; reduced screens of movie programs are arranged in the second horizontal row; and reduced screens of music programs are arranged in the third horizontal row. Further, in this instance, in each horizontal row, reduced screens of programs of the same category are arranged, for example, in an ascending order of the broadcasting channels of the programs or in an alphabetical order of the titles of the programs.

When the number of categories is four or more or when the number of programs of a category is four or more, a program or programs of an excessive number of categories or of an excessive number of programs of a category are arranged in another program selection screen. Then, a single virtual frame is formed from a plurality of (six) program selection screens (this will be hereinafter described).

Where a multi-preview screen in which reduced screens are arranged in such a manner as described above is displayed on the viewer side, the viewer can find out a desired program readily by observing (visually scanning) the multi-preview screen in a horizontal direction along a row of the category of the desired program.

Further, in this instance, if a predetermined cursor 201 is displayed on a predetermined one of the reduced screens forming such a multi-preview screen as seen in FIG. 5 and then moved on the multi-preview screen, then the viewer can find out and select a desired program readily.

Subsequently, production of a program selection screen will be described in more detail with reference to FIG. 6. The digitization section 51 converts a video signal and audio signals inputted thereto from analog signals into digital signals by means of an analog to digital (A/D) converter 231, from which the digital video and audio signals are outputted to a program sending out MPEG video/audio encoder/multiplexer system 232. Of the digital video signal, the video signal for 54 channels is supplied to multi-screen production circuits 201-1 to 201-6 of the archiving section 52. Where the input video and audio signals are supplied as digital signals, the digital signals are supplied as they are directly to the program sending out MPEG video/audio encoder/multiplexer system 232 and the multi-screen production circuits 201-1 to 201-6.

The multi-screen production circuit 201-1 includes nine RAMs 202-1-1 to 202-1-9 into which data of nine screens of different programs inputted to the multi-screen production circuit 201-1 are stored. Then, the data of the nine screens are reduced to ⅓ in the vertical direction and the horizontal direction to produce nine reduced screens. Then, the nine reduced screens are individually distributed to a multi-screen divided into 3×3=9 areas.

For example, where one screen (one frame) is formed from 720×480 picture elements, the numbers of picture elements are reduced to ⅓ in the horizontal direction and the vertical direction, or in other words, picture elements are sampled or thinned out, to produce an image of a reduced picture element of 240×160 picture elements. Then, such images of the reduced screens (3 pieces×3 pieces) are arranged in the horizontal direction and the vertical direction, to produce a multi-screen including nine reduced screens. The multi-screen is formed from 720×480 picture elements.

Similar processing is performed for the other five multi-screen production circuits 201-2 to 201-6. As a result, six multi-screens (program selection screens) each including nine reduced screens are produced.

Data of the six multi-screens produced by the multi-screen production circuits 201-1 to 201-6 in this manner are supplied to the corresponding MPEG video encoders 203-1 to 203-6, by which they are compressed by the MPEG system, respectively. Consequently, six archive data (for six broadcasting channels) are obtained.

Meanwhile, an EPG (Electrical Program Guide) data production apparatus 204 of the archiving section 52 produces, based on the digital video and audio signals received from the program sending out MPEG video/audio encoder/multiplexer system 232, electronic program guide data (EPG data) of the programs of the 54 broadcasting channels supplied to the multi-screen production circuits 201-1 to 201-6 from the program sending out MPEG video/audio encoder/multiplexer system 232. It is to be noted that the EPG data includes broadcasting starting times, broadcasting channel numbers, program categories, program names, positions on a multi-screen, and numbers (for example, 240×160 pieces) of picture elements of the reduced screens.

The video server 53 stores, in accordance with the necessity, the video data supplied thereto from the MPEG video encoders 203-1 to 203-6 of the archiving section 52 and the EPG data supplied thereto from the EPG data production apparatus 204 into a built-in memory thereof once and then reads out the stored data. Then, the video server 53 converts the thus read out data into packets and multiplexes (archives) them so that they may be transmitted via one transmission channel (channel corresponding to one transponder). In this instance, also archived audio data of the 54 programs are inputted to the video server 53 from the program sending out MPEG video/audio encoder/multiplexer system 232. Also the audio data are converted into packets and multiplexed so that they may be transmitted via the same transmission channel.

In this manner, the archived data including the six multi-screens (the six multi-screens construct one virtual frame) each including nine reduced screens are supplied as a signal of one transmission channel to a transmission line coding apparatus 221-1 of the transmission section 54.

An error correction coding apparatus 222-1 of the transmission line coding apparatus 221-1 performs error correction coding processing of the data inputted thereto from a multiplexer 211 and outputs the resultant data to a QPSK modulation circuit 223-1. The QPSK modulation circuit 223-1 QPSK-modulates the inputted data and outputs the resultant data to an up converter 224-1. The up converter 224-1 converts the data inputted thereto into a signal of a predetermined frequency band (signal corresponding to a transponder of the artificial satellite) and outputs the resultant data to a mixer 225.

In this manner, the transmission channel for the program selection screens is a transmission channel used exclusively.

In the meantime, the video data and the audio data of at least 54 programs (programs as screens of the full size) are individually compressed by the MPEG system by the program sending out MPEG video/audio encoder/multiplexer system 232 and converted into packets so that, for example, programs of each six broadcasting channels may be transmitted by one transmission channel, whereafter they are multiplexed. However, the number of broadcasting programs (broadcasting channels) to be multiplexed varies depending upon the complexity of the images of the broadcasting programs.

Then, the data of the one transmission channel are inputted to another transmission line coding apparatus 221-2, by which error correction coding processing and QPSK modulation processing are performed in a similar manner as described above by the transmission line coding apparatus 221-1. Then, data outputted from the transmission line coding apparatus 221-2 are converted into a signal of a predetermined frequency band corresponding to another transponder of the artificial satellite by another up converter 224-2 and then inputted to the mixer 225.

Data obtained by similar processing by further transmission line coding apparatus 221-3 to 221-n and up converters 224-3 (not shown) to 224-n are inputted to the mixer 225.

The mixer 225 mixes the data inputted thereto from the up converter 224-1 to 224-n and transmits resultant data to the artificial satellite 61 by means of the parabola antenna 55.

By the way, the system may be constructed so as to make it possible to display, on the viewer side, the numbers of the broadcasting channels together with a plurality of reduced screens as a multi-preview screen so that the viewer may select the broadcasting channel of a desired program by inputting the number of the broadcasting channel. In this instance, however, it may possibly occur that, for example, the viewer may mistake the broadcasting channel or may manually input a wrong number different from that corresponding to the intended broadcasting channel. Therefore, after such a preview screen as seen in FIG. 5 is displayed, it is desirable to display a parent screen of a desired program in response to the direct selection of a reduced screen corresponding to the program.

Figure 7:
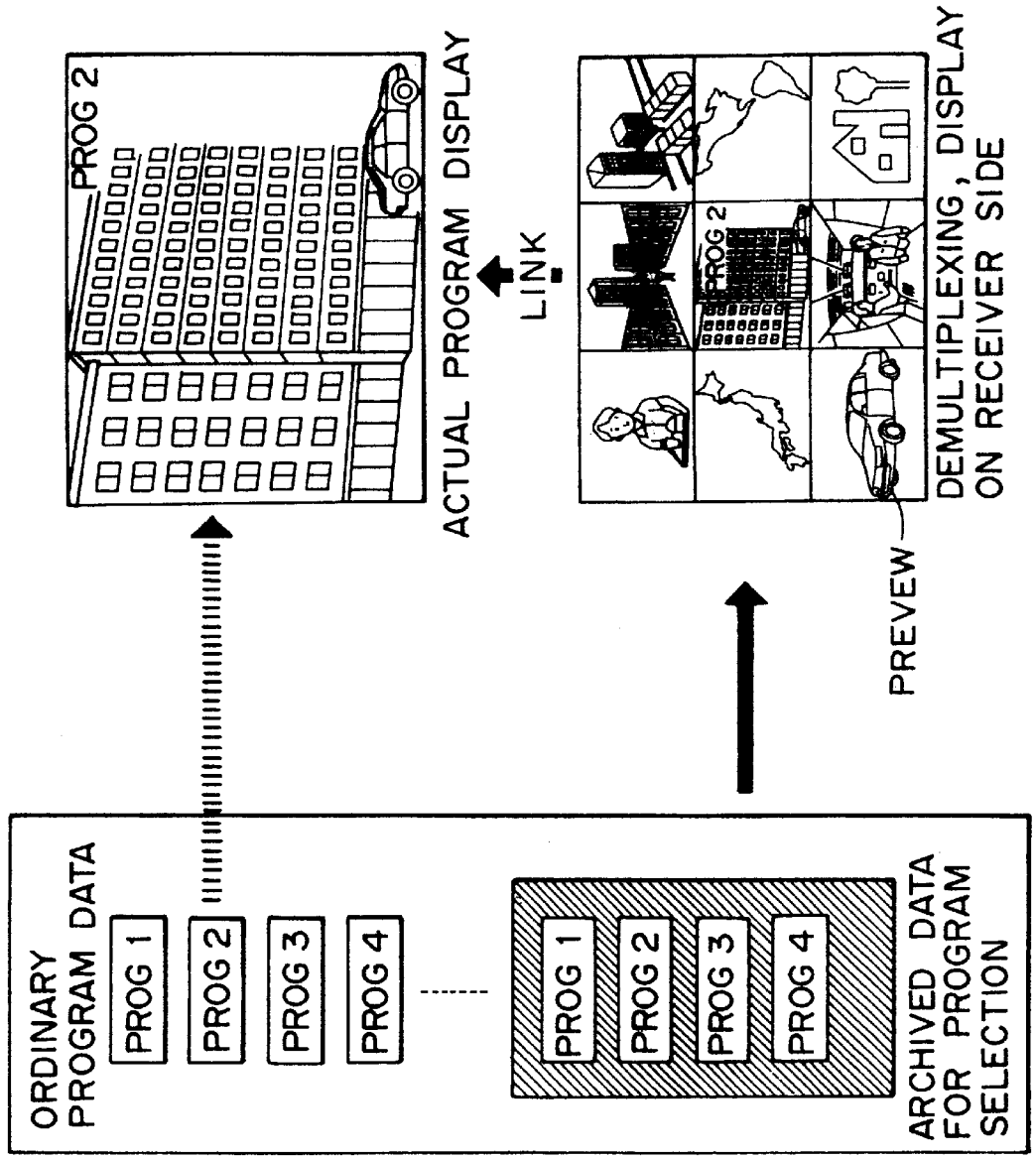
FIG. 7 is a diagrammatic view illustrating a link between data of an ordinary program and a reduced screen of the program.

To this end, the archiving section 52 provides a link between each reduced screen and a corresponding program. In particular, for example, the archiving section 52 adds, to data of each reduced screen, the number of a broadcasting channel of a program corresponding to the reduced screen and transmits the number of the broadcasting channel as EPG data. Consequently, when a reduced screen forming a preview screen is selected, a program linked to the reduced screen, that is, a screen (program) of the full size corresponding to the selected reduced screen, can be displayed. It is to be noted that FIG. 7 illustrates a manner wherein one of nine reduced screens forming a preview screen which is disposed at the center is selected, and consequently, in FIG. 7, a program PROG2 corresponding to the selected reduced screen is shown displayed in place of the preview screen.

Figure 8:
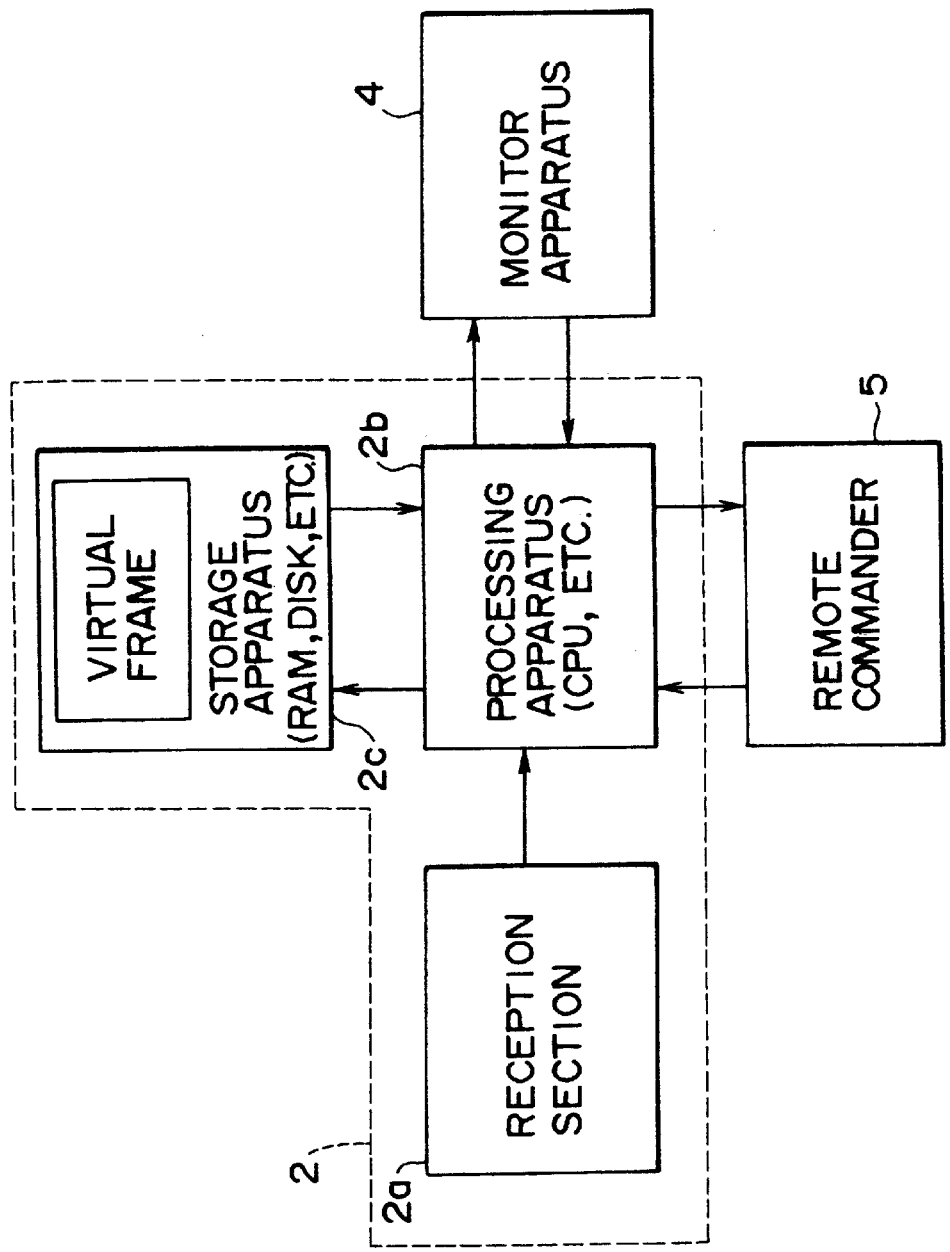
FIG. 8 is a block diagram showing a viewer side apparatus of the broadcasting system of FIG. 3.

Referring now to FIG. 8, there is shown an example of a general construction of the receiver 2 on the viewer side. The receiver 2 includes a reception section 2a, a processing apparatus 2b and a storage apparatus 2c. The reception section 2a receives a signal supplied thereto, for example, from the parabola antenna 3 (FIG. 3) and performs demodulation processing, error correction processing and other necessary processing. The resultant signal is outputted to the processing apparatus 2b. The processing apparatus 2b is formed from a CPU or the like and controls the reception section 2a so that the reception section 2a may output a signal of a predetermined channel. Then, the processing apparatus 2b decodes the signal supplied thereto from the reception section 2a and supplies, when the signal is an ordinary program data, the signal to the monitor apparatus 4 so that it may be displayed on the monitor apparatus 4 (it is to be noted that an audio signal is outputted as sound from a loudspeaker not shown).

On the other hand, when the signal supplied from the reception section 2a is archived data, the processing apparatus 2b decodes the archived data and stores data of reduced screens obtained by the decoding into an area secured in advance in the storage apparatus 2c, which may be, for example, a RAM, a magnetic disk or a magneto-optical disk, so that the six program selection screens of the virtual frame may form one screen.

It is to be noted that, where the archive data include audio data, also the audio data are supplied to and stored into the storage apparatus 2c.

Then, if a remote commander 5 is manually operated to input an instruction to display the reduced screens, then the processing apparatus 2b reads out a number of reduced screens (in the present embodiment, nine reduced screens as described above) which can be displayed on one screen of the monitor apparatus 4 from among the reduced screens stored in the virtual frame and supplies the thus read out reduced screens to the monitor apparatus 4 so that they may be displayed on the monitor apparatus 4.

The reduced screens read out from the virtual frame and displayed on the monitor apparatus 4 can be changed by manual operation of the remote commander 5. Accordingly, even if a number of reduced screens which cannot be simultaneously displayed on a screen are supplied, the viewer can observe all of the reduced screens by manual operation of the remote commander 5. Further, received reduced screens are successively stored into the virtual frame to update the stored reduced screens. However, for example, by keeping the reduced screens stored in the virtual frame for a predetermined period of time, reduced screens received in the past can be observed.

One of reduced screens displayed on the monitor apparatus 4 can be selected by manually operating the remote commander 5 to move and settle the cursor. If a reduced screen corresponding to a program desired by the viewer is selected, then the processing apparatus 2b delivers an instruction to the reception section 2a to output the program corresponding to the selected reduced screen (the program (screen of the full size) linked to the reduced screen) and then supplies ordinary program data obtained in response to the instruction to the monitor apparatus 4 so that the data may be displayed on the monitor apparatus 4.

Figure 9:
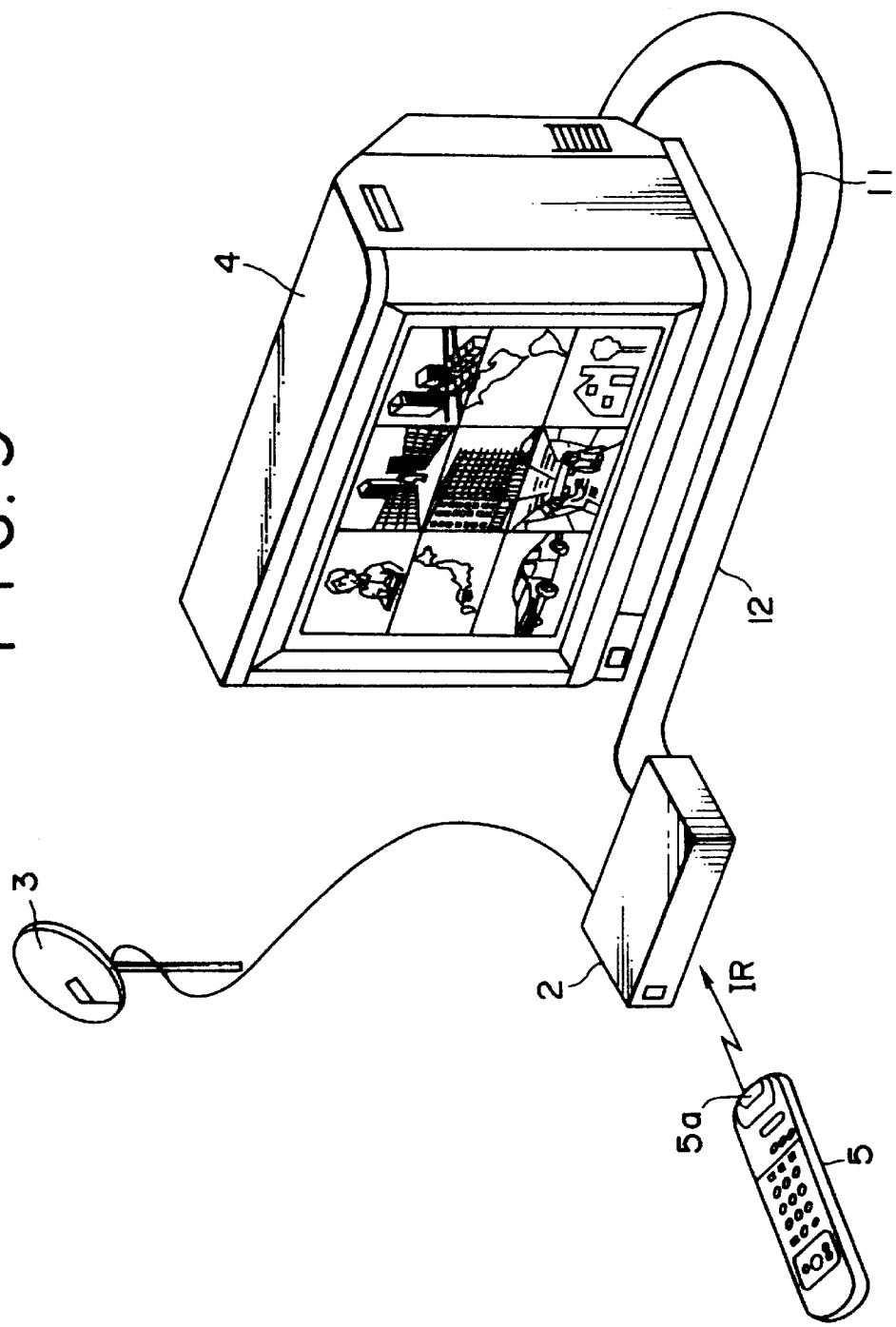
FIG. 9 is a perspective view showing an appearance of the viewer side apparatus of FIG. 3.

FIG. 9 shows an example of an appearance construction of the apparatus on the viewer side. In the present embodiment, the apparatus on the viewer side includes the receiver 2, the parabola antenna 3 and the monitor apparatus 4. The receiver 2 and the monitor apparatus 4 are connected to each other by means of an AV line 11 and a control line 12.

An instruction can be inputted to the receiver 2 from the remote commander 5 by an infrared ray (IR) signal. In particular, if a predetermined one of buttons and switches of the remote commander 5 is manually operated, then a corresponding infrared ray signal is emitted from an IR transmission section 5a and introduced into an IR reception section 39 (FIG. 11) of the receiver 2.

FIG. 10 shows an electric connection condition of the apparatus shown in FIG. 9. The parabola antenna 3 has an LNB (Low Noise Block downconverter) 3a, and converts (down converts) a signal from the artificial satellite 61 into a signal of a predetermined frequency and supplies the signal of the predetermined frequency to the receiver 2. The receiver 2 supplies its output to the monitor apparatus 4 via the AV line 11 formed from three lines including, for example, a composite video signal line, an audio L signal line and an audio R signal line.

Further, the receiver 2 has an AV apparatus control signal communication section 2A while the monitor apparatus 4 has an AV apparatus control signal communication section 4A. The AV apparatus control signal communication section 2A and the AV apparatus control signal communication section 4A are connected to each other by the control line 12 formed from a wired SIRCS (Wired Sony Infrared Remote Control System).

Figure 11A:
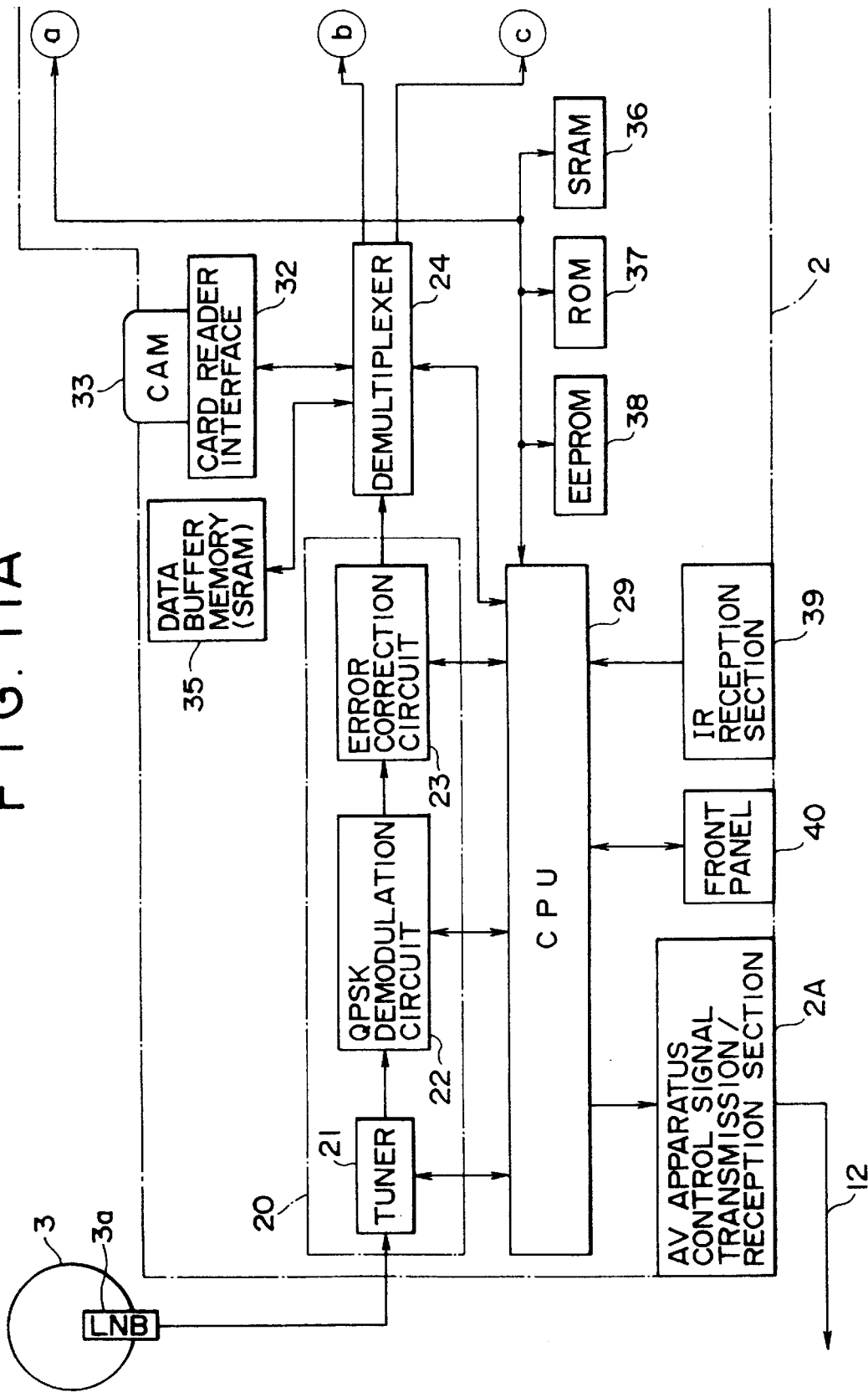
FIG. 11 is a block diagram showing a detailed construction of a receiver shown in FIG. 3.

FIG. 11 shows an example of an internal construction of the receiver 2 when the present invention is applied to the DSS described hereinabove. It is to be noted that a front end circuit 20, a demultiplexer 24 and a multi-channel real time decoder 25, and a virtual frame memory 49 correspond to the reception section 2a and the receiver 2 shown in FIG. 8, respectively. Further, the other blocks in FIG. 11 correspond to the processing apparatus 2b shown in FIG. 8.

A RF signal outputted from the LNB 3a of the parabola antenna 3 is supplied to and demodulated by a tuner 21 of the front end circuit 20. The output of the tuner 21 is supplied to a QPSK demodulation circuit 22, by which it is QPSK demodulated. The output of the QPSK demodulation circuit 22 is supplied to an error correction circuit 23, by which errors are detected and corrected.

A CAM (Conditional Access Module) 33 formed from, for example, an IC card including a CPU, a ROM, a RAM and so forth stores keys necessary for decipherment of a cipher together with a decipherment program. When a broadcasting station transmits data to which encipherment processing has performed, keys and decipherment processing are required to decipher the cipher. Therefore, the keys are read out from the CAM 33 via a card reader interface 32 and supplied to the demultiplexer 24. The demultiplexer 24 deciphers the enciphered signal using the keys.

It is to be noted that the CAM 33 stores, in addition to the keys and the decipherment program necessary for decipherment of a cipher, accounting information.

The demultiplexer 24 receives, as an input thereto, a signal outputted from the error correction circuit 23 of the front end circuit 20 and stores the received signal into a data buffer memory (SRAM: Static Random Access Memory) 35 once. Then, the signal is read out suitably and used for decipherment as described above. Then, when the result of the decipherment is ordinary program data, the demultiplexer 24 supplies image data or audio data forming the program data to the multi-channel real time decoder 25 or an MPEG audio decoder 26. The EPG data are stored into a predetermined area of the data buffer memory 35.

The multi-channel real time decoder 25 includes built-in MPEG video decoders 25-1 to 25-6 and DRAMs 25a-1 to 25a-6 in order that screen data of the programs of six broadcasting channels can be decoded as hereinafter described with reference to FIG. 16. The multi-channel real time decoder 25 thus stores image data (digital image data) inputted thereto suitably into the DRAMs 25a-1 to 25-6 and executes decoding processing of the video signals in a condition compressed by the MPEG system. The decoded video data are supplied, when they are data of an ordinary program, to an NTSC encoder 27, by which they are converted into a brightness signal (Y), a chroma signal (C) and a composite signal (V) of the NTSC system. The brightness signal and the chroma signal are outputted individually as S video signals via a pair of buffer amplifiers 28Y and 28C, respectively. The composite signal is outputted via a further buffer amplifier 28V.

Meanwhile, video data of a program selection screen are supplied to and stored into the virtual frame memory 49. Then, nine predetermined reduced screens are read out in accordance with the necessity and supplied to the NTSC encoder 27.

It is to be noted that an MPEG 2 decoding LSI (STi3500) by SGS-Thomson Microelectronics can be used for the MPEG video decoders 25-i of FIG. 16. An outline of the product is presented, for example, by Martin Bolton, in Nikkei Electronics, Nikkei PB Company, No. 603, Mar. 14, 1994, pp. 101–110.

Meanwhile, a transport stream of the MPEG2 (MPEG2-Transportstream) is described in Newest MPEG Textbook, ASCII, Aug. 1, 1994, pp. 231–253.

The MPEG audio decoder 26 suitably stores the digital audio signals supplied thereto from the demultiplexer 24 into a DRAM 26a and executes decoding processing of the audio signals in a condition compressed by the MPEG system. The thus decoded audio signals are converted from digital signals into analog signals by a digital to analog (D/A) converter 30, and the audio signal of the left channel is outputted via a buffer amplifier 31L while the audio signal of the right channel is outputted via a buffer amplifier 31R.

A RF modulator 41 converts the composite signal outputted from the NTSC encoder 27 and the audio signals outputted from the digital to analog converter 30 into an RF signal and outputs the RF signal. Further, when a TV mode in which a television broadcasting signal by a ground wave is to be received is set, the RF modulator 41 passes therethrough a RF signal of the NTSC signal inputted thereto from an AV apparatus (not shown) such as a cable box so that the RF signal is outputted as it is to a VCR (VTR) (not shown) or another AV apparatus (not shown).

In the present embodiment, the video signal and the audio signals are supplied to the monitor apparatus 4 via the AV line 11.

A CPU (Central Processor Unit) 29 executes various processes in accordance with a program stored in a ROM 37. For example, the CPU 29 controls the tuner 21, the QPSK demodulation circuit 22, the error correction circuit 23 and so forth. Further, the CPU 29 controls the AV apparatus control signal communication section 2A and outputs a predetermined control signal to another AV apparatus (in the present embodiment, the monitor apparatus 4) or receives a control signal from such another AV apparatus.

A predetermined instruction can be inputted directly to the CPU 29 by manually operating any of the operation buttons and switches (not shown) provided on a front panel 40 of the receiver 2 and can be inputted also by manually operating the remote commander 5. In particular, if the remote commander 5 (FIG. 9) is manually operated, then an infrared ray signal is emitted from the IR transmission section 5a and received by the IR reception section 39. A result of the reception is supplied to the CPU 29.

When a signal supplied from the front end circuit 20 is EPG data, the demultiplexer 24 supplies and stores the EPG data to and into the data buffer memory 35.

Data which is desired to be maintained even after disconnection of the power supply, for example, a reception program history of the tuner 21 for four weeks and the number of a channel (last channel) which has been received immediately before disconnection of the power supply are stored suitably into an EEPROM (Electrically Erasable Programmable Read Only Memory) 38. Then, for example, when the power source is connected subsequently, the same channel as the last channel is received again. However, if no last channel is stored, then a channel stored as a default channel in the ROM 37 is received. Further, when a sleep mode is set, even if the power source is in a disconnected condition, the CPU 29 keeps the minimum necessary circuits such as the front end circuit 20, the demultiplexer 24 and the data buffer memory 35 in an operative condition, and besides counts the current time from time information included in a received signal and also performs such control as to cause a required circuit to perform a predetermined operation at a required time (such as timer picture recording). For example, the CPU 29 executes automatic timer picture recording of a reserved program in cooperation with an external VCR.

Further, when the CPU 29 tries to produce predetermined OSD (On-Screen Display) data, it controls the MPEG video decoders 25-i. Under the control of the CPU 29, the MPEG video decoders 25-i produce predetermined OSD data and write the OSD data into OSD areas of the DRAMs 25a-i, whereafter they read out and output the OSD data. Consequently, predetermined characters, a predetermined graphic form (for example, a cursor, a broadcasting channel of a program being currently outputted from the receiver 2, or a bar whose length varies in response to the sound volume) or the like can be suitably outputted to the monitor apparatus 4 so that it may be displayed on the monitor apparatus 4.

Figure 12:
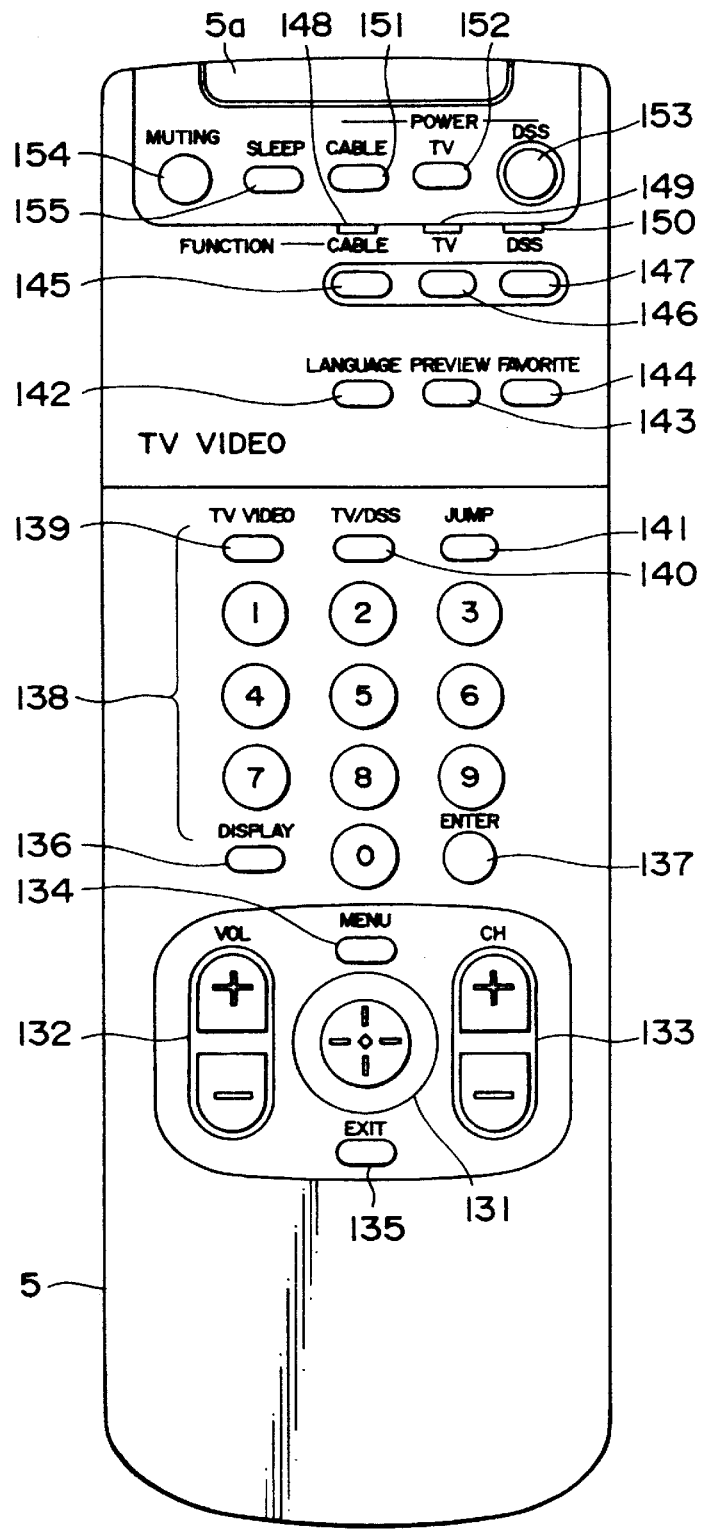
FIG. 12 is a plan view showing an appearance of a remote commander shown in FIG. 8.

FIG. 12 shows an example of a construction of buttons and switches of the remote commander 5. A select button (lever) 131 can be manually operated in a total of eight directions including the four leftward, rightward, upward and downward directions and in four intermediate oblique directions between them. The select button 131 can further be manually depressed (selection operation) in a perpendicular direction with respect to an upper face of the remote commander 5. A menu button 134 is manually operated in order to cause a predetermined menu screen to be displayed on the monitor apparatus 4. An exit button 135 is manually operated in order to restore an original ordinary screen display.

A channel up/down button 133 is manually operated in order to increment or decrement the number of a broadcasting channel to be received. A volume button 132 is manually operated in order to increase or decrease the volume of sound to be outputted.

Numeric or digit buttons (ten keys) 138 on which the digits of 0 to 9 are marked are manually operated in order to directly input, for example, a broadcasting channel or a like number. An enter button 137 is manually operated subsequently for manual operation of the numeric buttons 138 in order to instruct completion of the inputting of digital values when the manual operation of the numeric buttons 138 comes to an end. When the channel up/down button 133 or the enter button 137 and the numeric buttons 138 are manually operated or when a channel to be received is changed over using a preview screen, for example, a banner including the number of a new channel, a call sign (name), a logo and a mail icon is displayed for three seconds on the monitor apparatus 4. Two types of banners are prepared including a banner which has such a simple construction as described just above and another banner of a more detailed construction which additionally includes the title of a program, a broadcasting starting time, a current time and so forth. A display button 136 is manually operated in order to change over the type of the banner to be displayed.

A television/video change-over button 139 is manually operated in order to change over the input to the monitor apparatus 4 to the input from a tuner or a video input terminal (VCR or the like) built in a television receiver. A television/DSS change-over button 140 is manually operated in order to select a TV mode or a DSS mode in which a DSS signal is to be received. If the channel to be received is changed over, the channel prior to the changing over is stored, and a jump button 141 is manually operated in order to restore the original channel prior to the changing over.

A language button 142 is manually operated in order to select a desired language when broadcasting is proceeding with two or more languages. A preview button 143 is manually operated in order to cause the monitor apparatus 4 to display a preview screen. A favorite button 144 is manually operated in order to vary an array position when a reduced screen is to be stored (the details will be described later).

A cable button 145, a television button 146 and a DSS button 147 are function change-over buttons for changing over an apparatus category of a code of an infrared ray signal to be emitted from the remote commander 5. The cable button 145 is manually operated in order to receive a signal transmitted via a cable by a cable box (not shown) and display the received signal on the monitor apparatus 4. In response to the manual operation, a code of an apparatus category allocated to the cable box is emitted as an infrared ray signal.

Similarly, the television button 146 is manually operated in order to display a signal received by the tuner built in the monitor apparatus 4. The DSS button 147 is manually operated in order to receive a signal transmitted via the artificial satellite 61 by means of the receiver 2 and display the received signal on the monitor apparatus 4. LEDs 148, 149 and 150 are lit when the cable button 145, the television button 146 and the DSS button 147 are depressed, respectively. Consequently, when a button is manually operated, it is indicated to an apparatus of which category a code is transmitted.

When a cable power source button 151, a television power source button 152 or a DSS power source button 153 is manually operated, the power source for the cable box, the monitor apparatus 4 or the receiver 2 is turned on or off.

A muting button 154 is manually operated in order to set or cancel a muting condition of the monitor apparatus 4. A sleep button 155 is manually operated in order to set or cancel a sleep mode in which the power source is turned off automatically when a predetermined point of time comes or when a predetermined interval of time passes.

Figure 13:
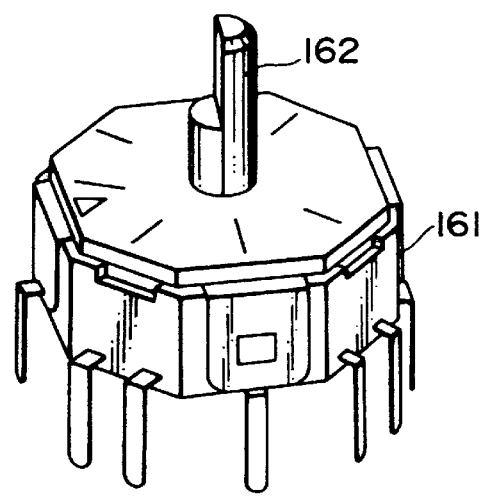
FIG. 13 is an enlarged perspective view showing an appearance of a small size stick switch serving as a select button of the receiver of FIG. 11.

FIG. 13 shows an example of the construction of a small stick switch which is used as the select button 131. The small stick switch shown includes a body 161 and a lever 162 extending from the body 161. When the select button 131 is manually operated in any one of the eight directions in a horizontal plane, the small stick switch is turned corresponding to the operation direction, but when the select button 131 is manually operated for selection (manually operated vertically), the lever 162 is pushed down in the vertical direction.

It is to be noted that, for the small stick switch, for example, a small stick switch of the model RKJXL1004 by Alps Denki can be used. The thickness of the body 161 of the small stick switch is about 6.4 mm.

Figure 14:
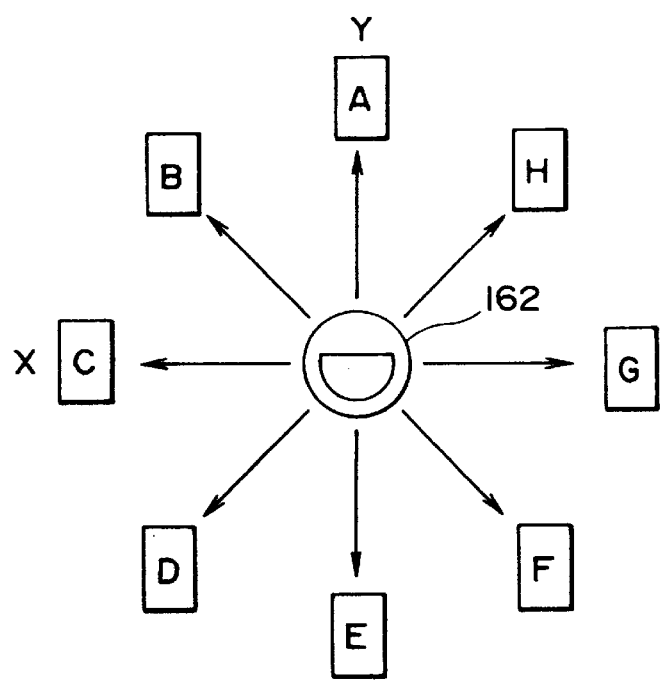
FIG. 14 is a diagrammatic view showing operation directions of a lever shown in FIG. 12 in a horizontal plane.

FIG. 14 shows the eight operation directions of the lever 162 in the horizontal plane. As seen in FIG. 14, the lever 162 is constructed so that it can be manually operated in any one of the eight directions denoted by A to H in the horizontal plane.

Figure 15:
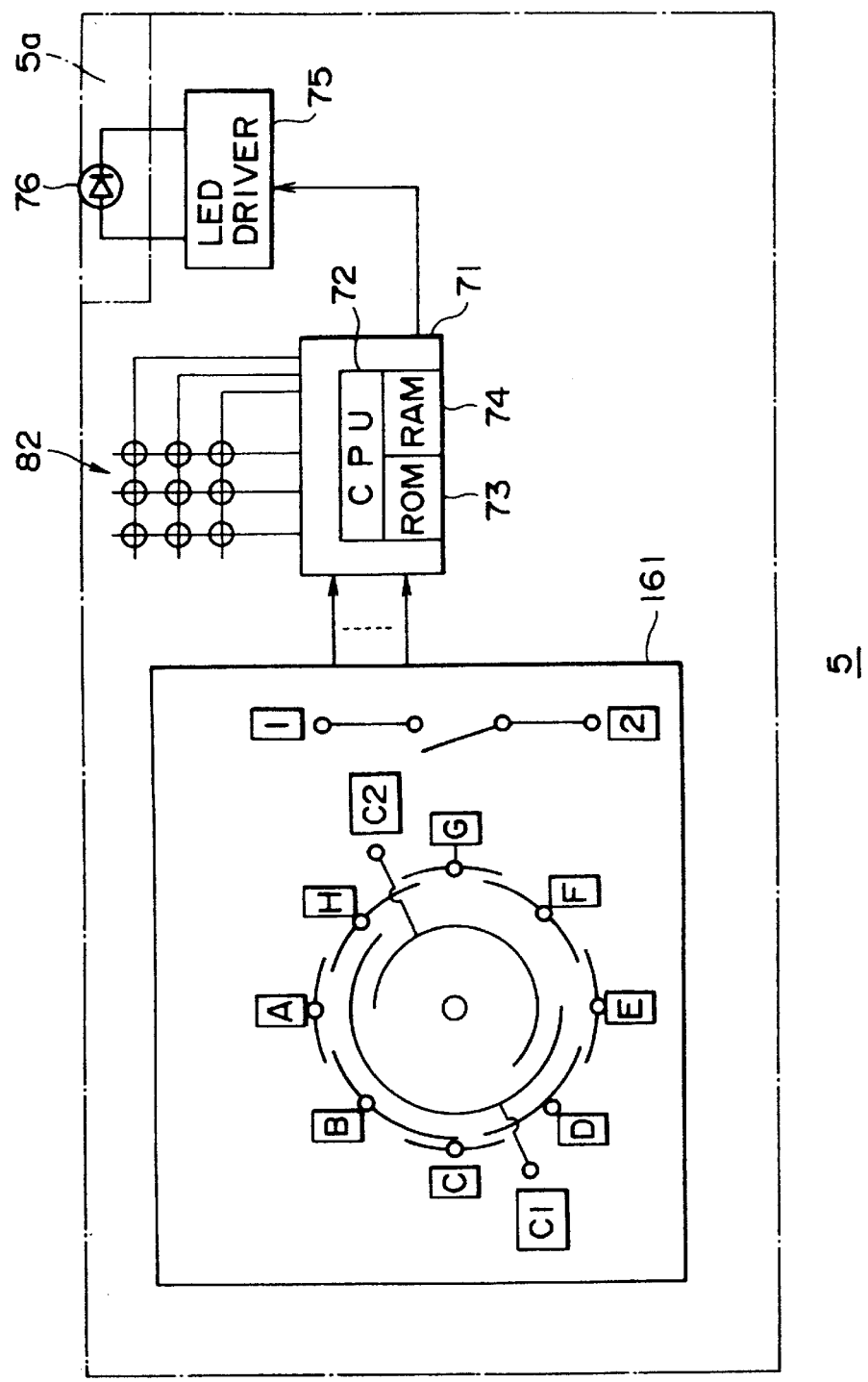
FIG. 15 is a diagrammatic view showing an internal construction of the remote commander of FIG. 8.

FIG. 15 shows an example of an internal construction of the remote commander 5. As seen from FIG. 15, contacts A to H in the inside of the body 161 of the small stick switch correspond to the eight directions A to H shown in FIG. 14, respectively, and when the lever 162 is manually operated in one of the directions A to D, a corresponding one of the terminals A to D is connected to a terminal C1. On the other hand, when the lever 162 is tilted to one of the directions E to H, a corresponding one of the terminals E to H is connected to another terminal C2. Further, when the lever 162 is tilted in a direction between the directions H and A or between the directions D and E, both of the terminals C1 and C2 are connected to each other. Furthermore, when the lever 162 is manually operated in the vertical direction, the terminals 1 and 2 are connected to each other.

The connection condition of the terminals of the body 161 is monitored by a CPU 72 which forms a microcomputer 71. Consequently, the CPU 72 can detect a directional operation and a selection operation of the select button 131. Further, the CPU 72 normally scans a button matrix 82 to detect an operation of any other button of the remote commander 5.

The CPU 72 executes various processes in accordance with a program stored in a ROM 73 and suitably stores necessary data into a RAM 74. Then, when an infrared ray signal is to be outputted, the CPU 72 drives an LED 76 via an LED driver 75 so that an infrared ray signal is outputted from the LED 76.

Subsequently, operation of the receiver 2 when the preview button 143 is manually operated will be described with reference to FIGS. 11 and 16. When the preview button 143 is manually operated, an instruction to cause the monitor apparatus 4 to display a preview screen is inputted to the CPU 29 via the IR reception section 39. Upon reception of the instruction, the CPU 29 outputs an instruction to the front end circuit 20 to receive the transmission channel of the archived data. Consequently the, archived data is supplied from the front end circuit 20 to the demultiplexer 24.

In particular, the tuner 21 receives and demodulates a signal from the transmission channel for exclusive use for a program selection screen. The output of the tuner 21 is then QPSK demodulated by the QPSK demodulation circuit 22, and then error correction processing of the output of the QPSK demodulation circuit 22 is performed by the error correction circuit 23. The output of the error correction circuit 23 is inputted to the demultiplexer 24. The data inputted to the demultiplexer 24 include packets of video data of six multi-screens described above and packets of audio data of the 54 programs.

If it is assumed that those packets have data IDs (packet IDs) of the numbers 1 to 6 added thereto, then the data having the data IDs of the numbers 1 to 6 are demultiplexed (separated). Then, the data is decoded by the corresponding MPEG video decoders 25-1 to 25-6 of the multi-channel real time decoder 25 and then supplied to and stored into the DRAMs 25*a*-1 to 25*a*-6. In particular, the multi-screen of the packet ID 1 is stored into the DRAMs 25*a*-1, and similarly, the multi-screens of the data IDs 2 to 6 are stored into the DRAMs 25*a*-2 to 25*a*-6, respectively.

Then, the six multi-screens stored in the DRAMs 25*a*-1 to 25*a*-6 are read out from them and developed and stored into the virtual frame memory 49 such that they may construct one virtual screen. In the arrangement shown in FIG. 16, the multi-screen indicated by No. 1 of the data ID 1 is arranged at the left upper corner of the virtual screen; the multi-screen indicated by No. 2 of the data ID 2 is arranged on the right side of the multi-screen of the data ID 1; the multi-screen indicated by No. 3 of the data ID 3 is arranged on the lower side of the multi-screen of the data ID 1; the multi-screen indicated by No. 4 of the data ID 4 is arranged on the right side of the multi-screen of the data ID 3; the multi-screen indicated by No. 5 of the data ID 5 is arranged on the lower side of the multi-screen of the data ID 3; and the multi-screen of the data ID 6 is arranged on the right side of the multi-screen of the data ID 5.

It is to be noted that, as described hereinabove, the data of the six multi-screens indicated by No. 1 to No. 6 are transmitted by one transmission channel (by a carrier from one transponder). Accordingly, even if the front end circuit 20 including the tuner 21 is provided by one channel as seen in FIG. 16, if the six MPEG video decoders 25-1 to 25-6 are provided, then six multi-screens can be received at a time and stored into the virtual frame memory 49.

If one or more multi-screens forming a program selection screen are transmitted via a transmission channel or channels corresponding to another transponder or transponders, then in order to receive the multi-screen of the transmission channel or one of the transmission channels, the reception frequency of the tuner 21 must be changed over, and after all, it is impossible to receive all multi-screens at a time (naturally this becomes possible if a plurality of the tuners 21 are provided, which, however, complicates the construction and raises the cost). Therefore, only one transmission channel (common transmission channel) is preferably used to transmit the program selection screen.

Figure 17:
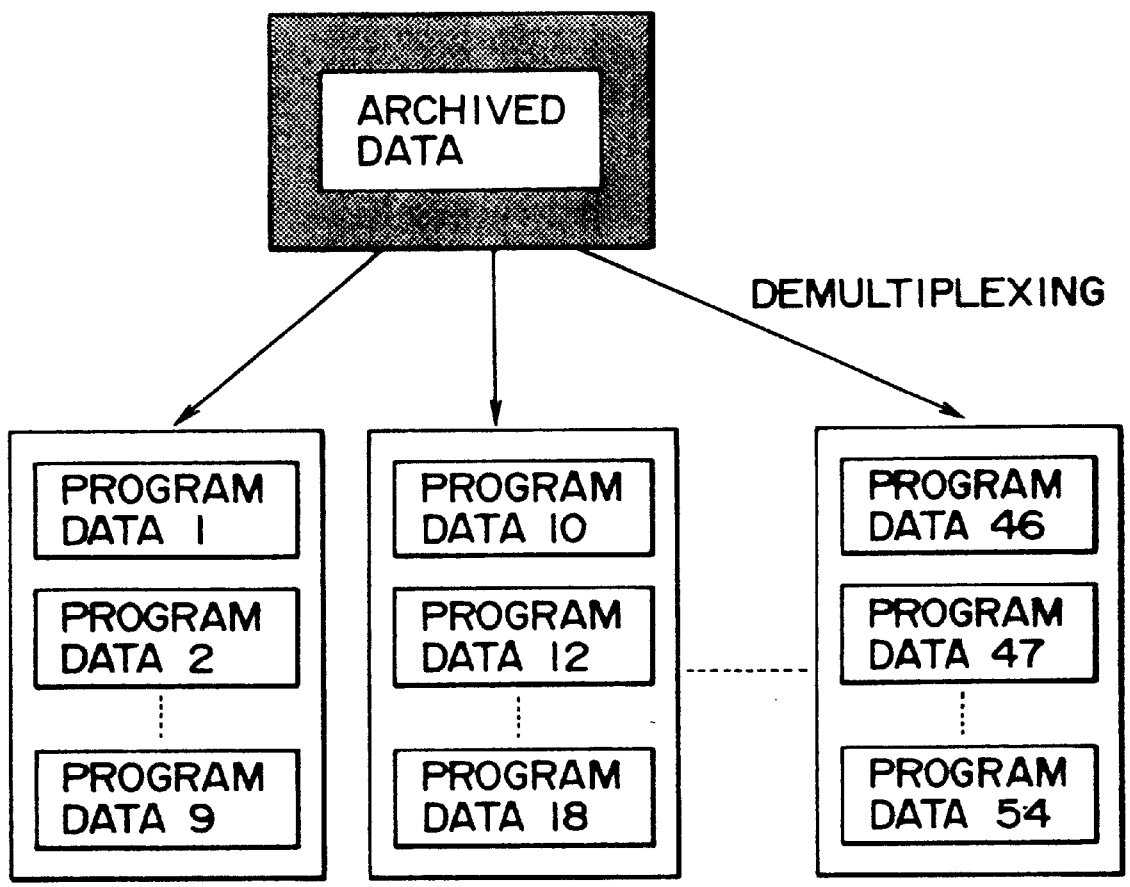
FIG. 17 is a diagrammatic view illustrating a manner in which archived data are separated.
Figure 18:
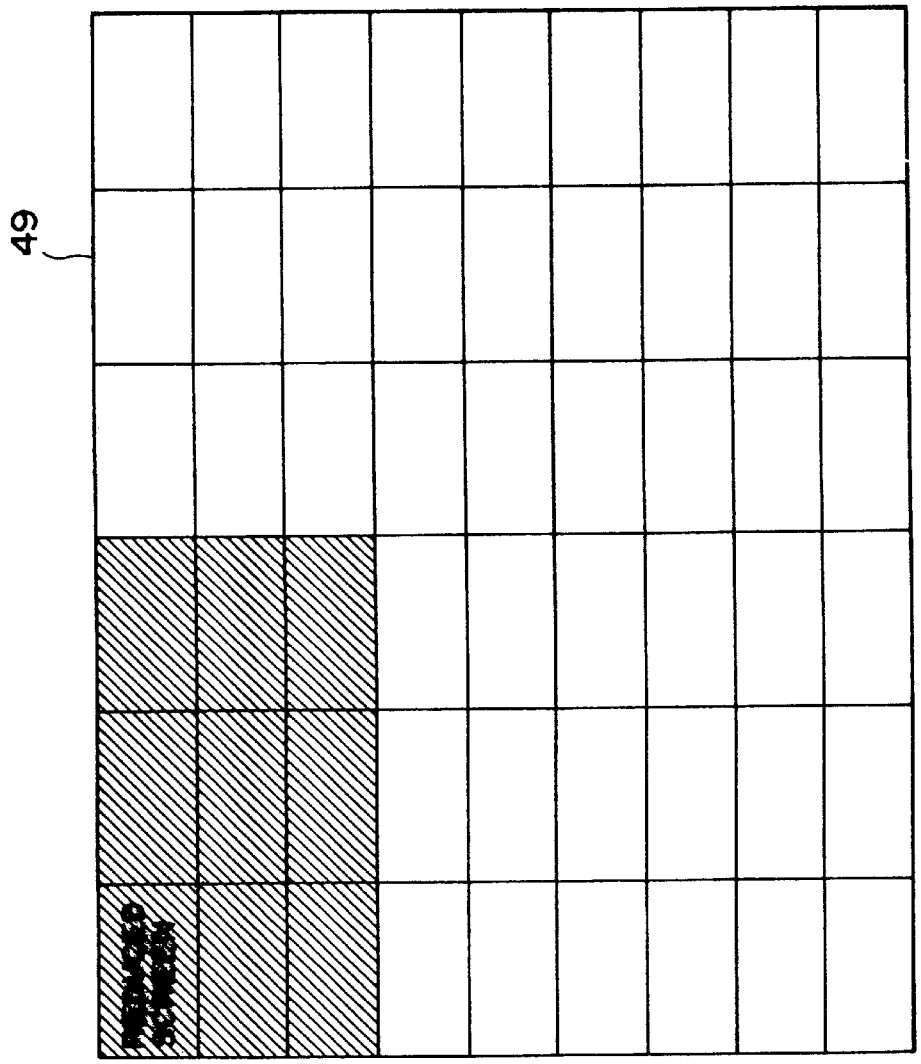
FIG. 18 is a diagrammatic view illustrating a condition wherein reduced screens are stored in a matrix array in a virtual frame.

The processing of receiving a plurality of program selection screens from a single transmission channel (archived data) and storing the program selection screens into the virtual frame memory 49 is schematically illustrated in FIGS. 17 and 18.

In particular, when the demultiplexer 24 receives archived data which include six program selection screens, it separates the archived data into individual program selection screens as seen in FIG. 17. Then, the resulting six program selection screens are stored in a matrix into the virtual frame memory 49 as seen in FIG. 18. Accordingly, the virtual frame memory 49 can be considered to be a virtual or imaginary screen (greater than one multi-screen) on which 6×9 reduced screens of programs of different broadcasting channels transmitted thereto from the broadcasting station are arranged. Since each of the reduced screens is an ordinary screen of a program of a reduced size, it exhibits an image of full motion of the frame rate of 30 fps (full moving picture), and accordingly, if the entire virtual frame memory 49 is displayed, then contents of programs (reduced screens) of 54 broadcasting channels transmitted thereto from the broadcasting station can be observed in full motion.

Here, when the reduced screens are stored into the virtual frame memory 49, if the six multi-screens are not arranged as they are at the respective 2×3 predetermined positions of the virtual frame memory 49 but the individual reduced screens are managed independently of each other by the CPU 29 (picture element data of the virtual frame are managed in units of 240×160 picture elements), then the reduced screens can be arranged at arbitrary positions of the 6×9 child screens of the virtual frame memory 49.

In this instance, for example, the reduced screens may be arranged in order such that a predetermined number of them are arranged in the uppermost horizontal row of the virtual frame memory 49 from the left end toward the right and then those of the same number are arranged in the second horizontal row from the left end toward the right, whereafter the other reduced screens are successively arranged in a similar manner, or may be arranged for individual program categories described hereinabove with reference to FIG. 5. When the reduced screens are arranged for individual program categories, the broadcasting station side may add to each reduced screen the category of a program corresponding to the reduced screen as EPG data. In this instance, the receiver 2 is constructed such that it reads the category of the program added to the reduced screen from the EPG data and arranges such reduced screens for individual program categories on the virtual frame memory 49.

Alternatively, it is possible to arrange reduced screens on the virtual frame memory 49 in a manner of arrangement desired by a viewer. In particular, where the broadcasting side adds the category of a program to a reduced screen as described above, the receiver side apparatus can be constructed such that the remote commander 5 is manually operated to set the order of categories of programs so that reduced screens are successively arranged in the set order on the virtual frame memory 49 beginning with the uppermost horizontal row.

Further, for example, where the broadcasting station side adds to each reduced screen the broadcasting channel of a program corresponding to the reduced screen, the receiver side apparatus can be constructed such that the remote commander 5 is manually operated to set the order of the broadcasting channels of programs so that reduced screens are successively arranged in the set order on the virtual frame memory 49 beginning with the uppermost horizontal row.

Further, since reduced screens stored in the virtual frame memory 49 are displayed on the monitor apparatus 4, it is possible to change the array positions of the reduced screens stored in the virtual frame memory 49 by manual operation of the remote commander 5 while observing the display of the reduced screens.

Accordingly, in this instance, the reduced screens can be arranged in accordance with the preference of the viewer. In other words, the array of the reduced screens can be customized.

Further, where the broadcasting station side transmits reduced screens in a condition arranged in different individual categories of programs as described hereinabove with reference to FIG. 5, the reduced screens can be stored in the arranged condition into the virtual frame memory 49. However, even if the reduced screens are transmitted in such an arranged condition for individual program categories, the reduced screens may be re-arranged in accordance with a manner of arrangement desired by the viewer as described above.

It is to be noted that such a manner of arrangement (array order) as mentioned above can be set by manually operating the remote commander 5 based on a predetermined menu screen displayed on the monitor apparatus 4 in response to a manual operation of the menu button 134 of the remote commander 5. The manner of arrangement thus set is, for example, stored into the EEPROM 38. When a manner of arrangement is set in the EEPROM 38, the CPU 29 designates to the demultiplexer 24 an array order which is used to store the reduced screens into the virtual frame memory 49. Then, the demultiplexer 24 stores the reduced screens into the virtual frame memory 49 in accordance with the array order designated from the CPU 29.

Figure 19:
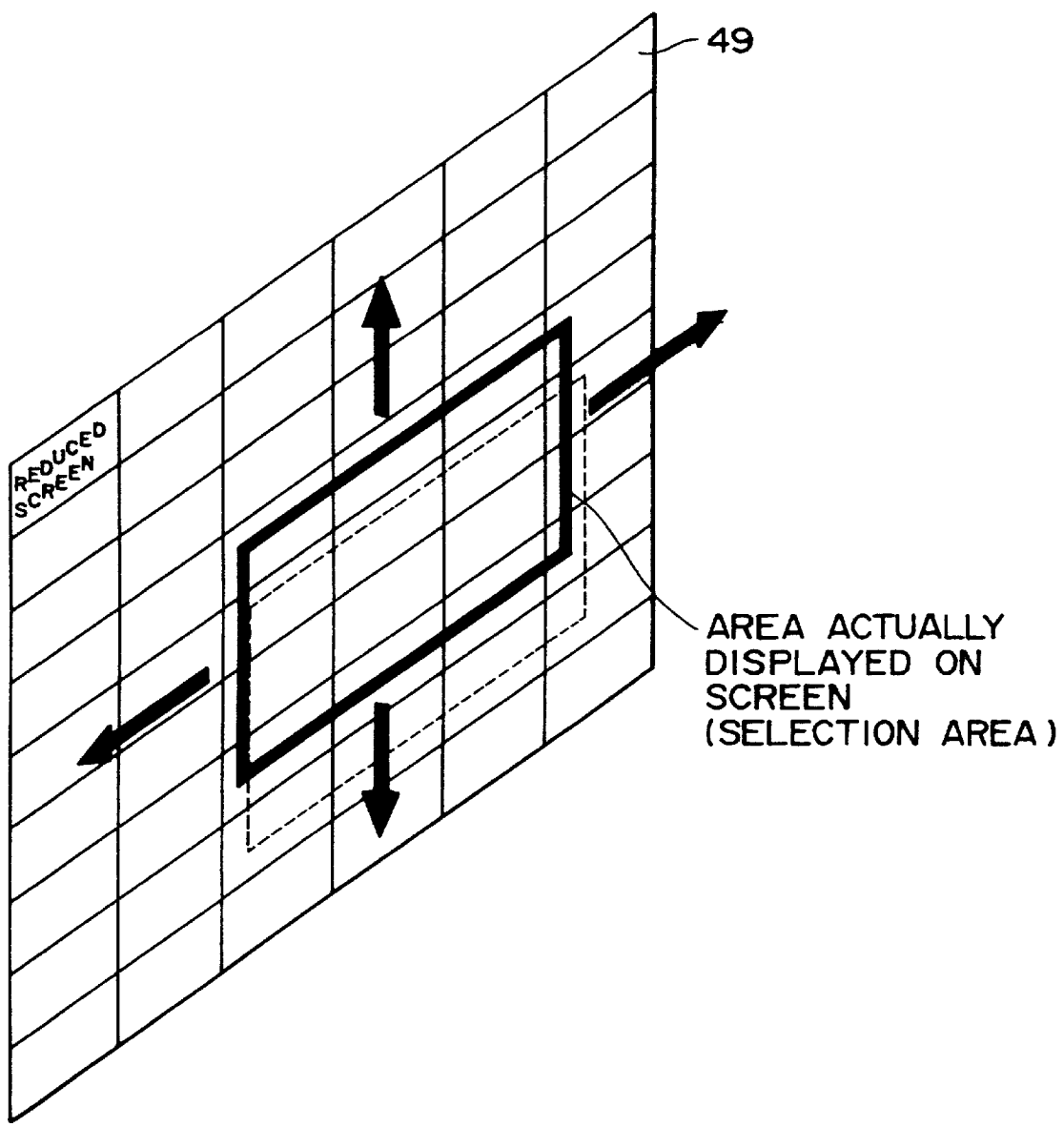
FIG. 19 is a schematic view showing a range of a reduced screen to be displayed on a monitor apparatus.

After the reduced screens are stored into the virtual frame memory 49, those of the reduced screens which are included in a range (selection area) within which they can be displayed at a time on one screen of the monitor apparatus 4 are designated by the CPU 29. In particular, in the present embodiment, since one reduced screen corresponds to a screen of an ordinary program which is reduced to ⅓ in vertical and horizontal lengths thereof as described above, for example, such 3×3 reduced screens surrounded by a thick line in FIG. 19 are read out. Then, the 3×3 reduced screens are supplied from the receiver 2 to be displayed on the monitor apparatus 4 as seen in FIG. 9. In other words, a preview screen is displayed.

Here, when a predetermined range of 3×3 reduced screens from among the reduced screens stored in the virtual frame memory 49 is displayed as described above, it can be considered that the screen of the monitor apparatus 4 is used as such so that the reduced screens on the virtual frame memory 49 are partially seen.

Figure 20:
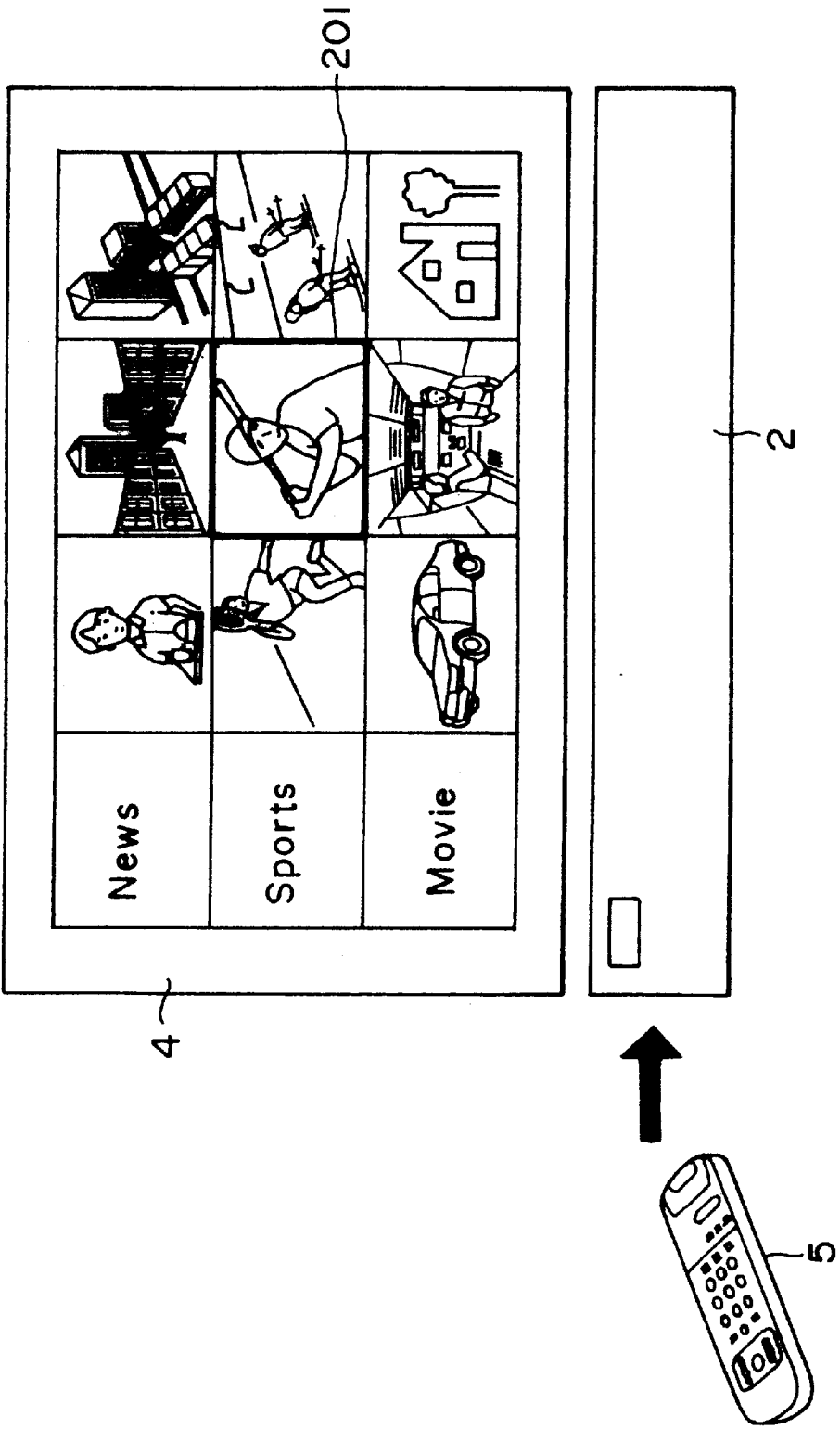
FIG. 20 is a schematic view showing reduced screens displayed on the monitor apparatus.

Then, in this instance, the monitor apparatus 4 displays, together with 3×3 reduced picture elements as a preview screen, the cursor 201 in the form of a frame which surrounds a certain reduced screen as seen in, for example, in FIG. 20 in a superimposed condition by OSD display on the screen. It is to be noted that the cursor 201 is not limited to such a cursor in the form of a frame as described above, but may be any graphic form such as an arrow mark or the like only if it can be identified clearly for selection.

When the cursor 201 is positioned, for example, at a central one of 3×3 reduced screens, if the select button 131 of the remote commander 5 is directionally operated (tilted) upwardly (away from the viewer), downwardly (toward the viewer), rightwardly, leftwardly, obliquely rightwardly upwards, obliquely rightwardly downwards, obliquely leftwardly upwards or obliquely leftwardly downwards, then the cursor 201 is moved to the position at which it surrounds the reduced screen positioned upwardly, downwardly, rightwardly, leftwardly, obliquely rightwardly upwards, obliquely rightwardly downwards, obliquely leftwardly upwards or obliquely leftwardly downwards with respect to the central reduced screen.

Here, if the select button 131 is further manually operated directionally while the cursor 201 remains positioned at the upper, lower, left or right end of the screen of the monitor apparatus 4, the contents of the display of the monitor apparatus 4, that is, the preview, is scrolled. For example, if the select button 131 is manually operated downwardly while the cursor 201 is positioned at the lowest row of the preview screen, then the preview is scrolled upwardly by one row distance.

This scrolling is performed such that, for example, in place of the 3×3 reduced screens surrounded by a thick line in FIG. 19, other 3×3 reduced screens surrounded by a dotted line in FIG. 19 are read out from the virtual frame memory 49 and supplied to the monitor apparatus 4. It is to be noted that, since the cursor 201 remains stopped at the lowermost row, the cursor 201 is relatively moved downwardly by one row distance in the virtual frame memory 49 shown in FIG. 18 (or 19).

Figure 21:
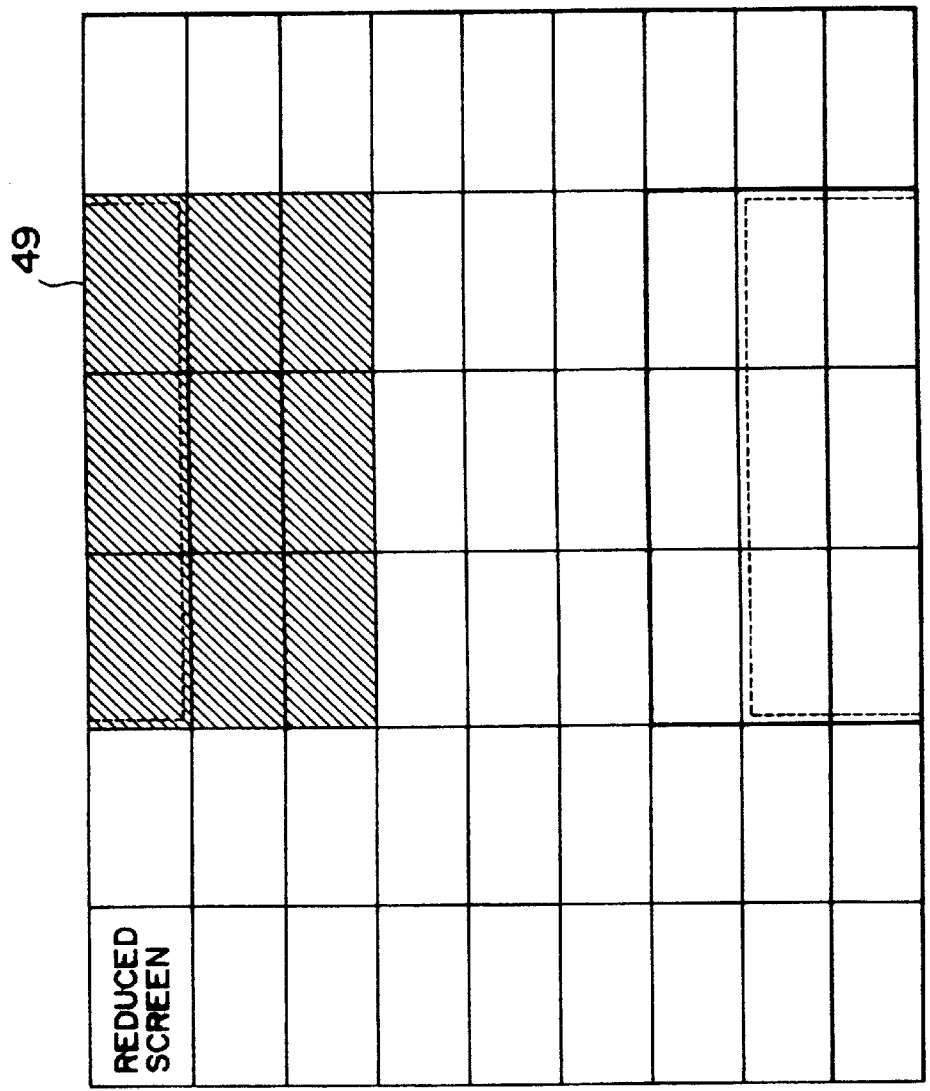
FIG. 21 is a schematic view showing a reduced screen displayed on the monitor screen as a result of manual operation of the remote commander for scrolling.

Further, when, for example, 3×3 reduced screens including reduced screens arranged in the lowermost row of the virtual frame 35 (3×3 reduced screens surrounded by a thick line in FIG. 21) are displayed on the monitor apparatus 4 while the cursor 201 remains at the lower end position of the screen of the monitor apparatus 4 as seen in FIG. 21, if the select button 131 is manually operated downwardly, then the screen of the monitor apparatus 4 is scrolled. Consequently, 3×2 reduced screens in the lowermost row and the second lowermost row and 3×1 reduced screens in the uppermost row surrounded by dotted lines in FIG. 21 are displayed on the monitor apparatus 4.

Accordingly, when the 3×3 reduced screens surrounded by the thick line in FIG. 21 are displayed on the monitor apparatus 4 while the cursor 201 is at the lower end position of the screen of the monitor apparatus 4, if a downward operation of the select button 131 is performed three times successively, then 3×3 reduced screens including the reduced screens in the uppermost row and indicated by slanting lines in FIG. 21 are displayed.

Scrolling is performed in a similar manner with regard to the upward, leftward, rightward, obliquely rightwardly upward, obliquely rightwardly downward, obliquely leftwardly upward or obliquely leftwardly downward directions.

A scrolling signal (operation signal) corresponding to the direction of a manual operation of the select button 131 is received by the CPU 29 of the receiver 2 and the read address of the virtual frame memory 49 is controlled in response to the received operation signal by the CPU 29. In particular, the CPU 29 recognizes, based on the received operation signal, a range of reduced screens to be displayed on the monitor apparatus 4. Then, the CPU 29 delivers an instruction to the virtual frame memory 49 to read out the reduced screens in the thus recognized range. Consequently, the reduced screens within the instructed range are read out from the virtual frame memory 49 and outputted to the monitor apparatus 4. As a result, the screen of the monitor apparatus 4 is scrolled.

Accordingly, in this instance, the manual operation of the select button 131 can be considered to be an operation for designating reduced screens to be read out from the virtual frame memory 49.

Since the preview screen is scrolled as described above, even if the number of programs is greater than the number of programs of reduced screens which can be displayed at a time on the monitor apparatus 4, the preview screen of all programs can be provided to the viewer.

While observing such reduced screens of full motion displayed on the monitor apparatus 4 as shown in FIG. 20, the viewer manually operates the select button 131 to move the cursor 201 to a desired reduced screen. Then, if the select button 131 is manually operated vertically (selection operation) in order to settle selection of the television program while the cursor 201 is positioned at the desired reduced screen, the CPU 29 sends an instruction to the front end circuit 20 to receive the program of a channel linked to the selected reduced screen.

In response to the instruction, the tuner 21 of the front end circuit 20 is tuned to the transmission channel of the instructed program and outputs packet data of a plurality of programs included in the transmission channel to the demultiplexer 24. The demultiplexer 24 separates the packet of a predetermined program from within the packets of the plurality of programs in response to an the instruction from the CPU 29 and outputs the separated packet to the MPEG video decoder 25-1. Decoded data from the MPEG video decoder 25-1 are processed by the NTSC encoder 27 and outputted to the monitor apparatus 4 via the succeeding blocks. The monitor apparatus 4 thus displays, in place of the preview screen, an image of the program outputted from the receiver 2.

In short, the viewer can enjoy a desired program by moving the cursor 201 to a desired reduced screen and then manually operating the select button 131 vertically.

It is to be noted that sound is incidental to the program selection screen, and the demultiplexer 24 separates an audio signal corresponding to a reduced screen at which the cursor 201 is positioned (sound of a program corresponding to the reduced screen) and supplies the audio signal to the MPEG audio decoder 26 so that the audio signal may be decoded by the MPEG audio decoder 26. Consequently, while the viewer observes the reduced screen of full motion at which the cursor 201 is positioned, the viewer can listen to sound incidental to the reduced screen simultaneously on the real time basis. In this instance, changing over of sound is achieved by the CPU 29 which successively re-sets the data ID of an audio packet to be separated to the demultiplexer 24 by movement of the cursor 201.

The sequence of manual operations described above including the directional operation of the select button 131 an one of the eight directions for moving the cursor 201 and the vertical operation (selection operation) of the select button 131 performed subsequently to the directional operation for settling selection of a program corresponding to a reduced screen at which the cursor 201 is positioned can be performed all merely using the thumb without reholding the remote commander 5. Accordingly, the apparatus is improved in operability.

Figure 6:
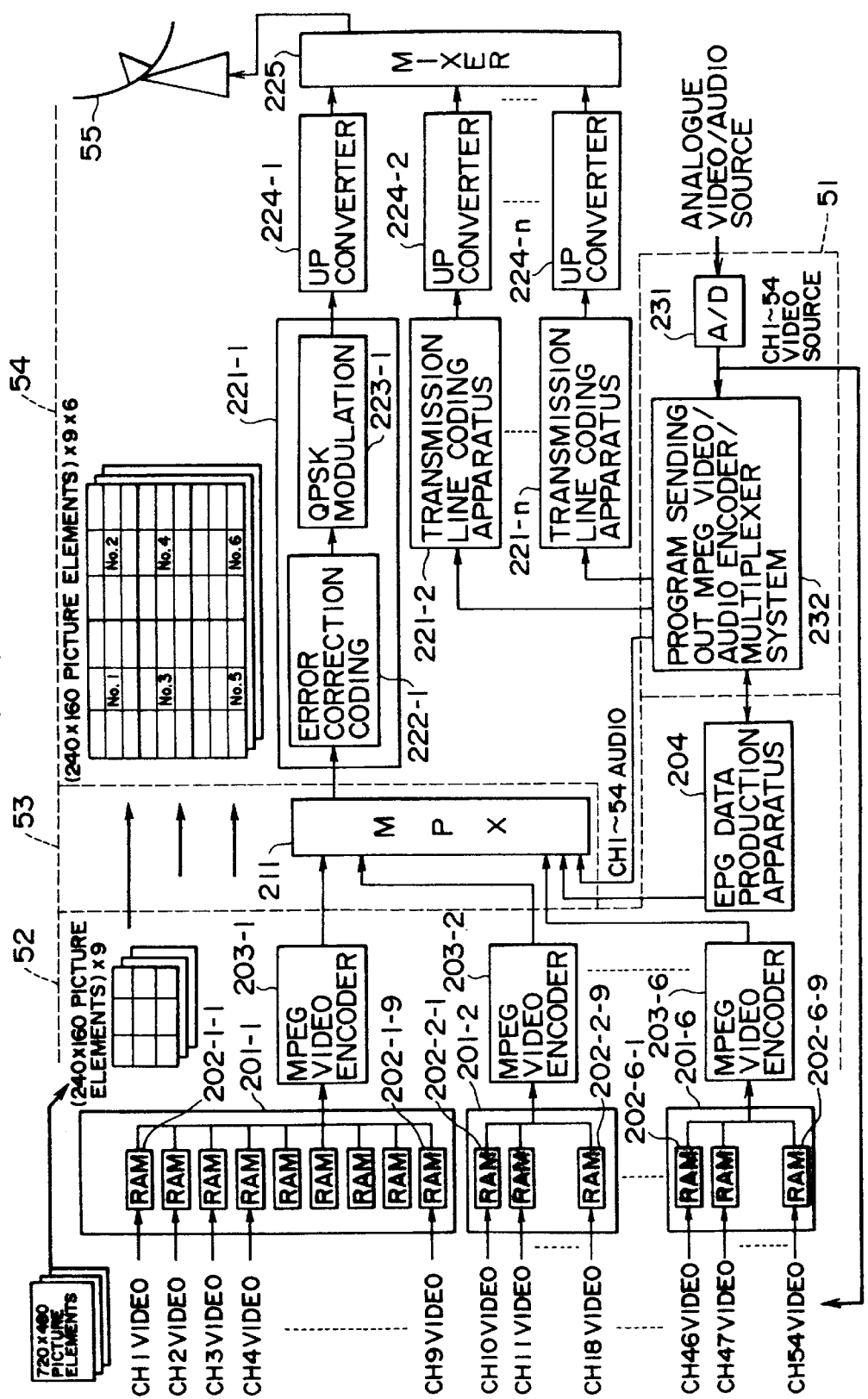
FIG. 6 is a diagrammatic view showing a more detailed construction of part of the broadcasting system shown in FIG. 3.

By the way, while the example of the simple construction of the transmission section 54 shown in FIG. 3 is shown in FIG. 6, the transmission section 54 may be formed, for example, from an encoder (not shown) of the direct broadcast satellite system by which transmission data are produced. Details of the direct broadcast satellite system are presented by L. W. Butterworth, J. P. Godwin and D. Radbel, in "The Technique for Supporting the Information Superhighway of the United States", Nikkei electronics, Nikkei BP, Oct. 24, 1994, pp. 180–189.

This encoder delineates data from the video server 53 for individual broadcasting channels (also data of the program selection screen are regarded as data of one broadcasting channel), and divides data of the broadcasting channels into packets of a predetermined size. Then, a header is added to each of the packets, and the data is transmitted in units of a packet.

Then, the packets are transmitted, for example, to high output transponders for the BSS band of 12.2 GHz to 12.7 GHz carried on the artificial satellite 61. In this instance, packets of a plurality of (nine in the maximum) broadcasting channels are multiplexed with a signal of a predetermined frequency allocated to each of the transponders and are transmitted to the transponder. In other words, each of the transponders transmits a plurality of signals of different broadcasting channels with one carrier (one transmission channel). Accordingly, if the number of such transponders is 23, then data of 207 (=9×23) broadcasting channels in the maximum can be transmitted.

In this instance, in the receiver 2, the carrier of one frequency corresponding to a predetermined one of the transponders is received and demodulated by the front end circuit 20. Consequently, packet data of nine broadcasting channels in the maximum are obtained. Then, the demultiplexer 24 stores the packets obtained from the demodulation output of the front end circuit 20 once into the virtual frame 35 and then reads out the packets. Then, data of a packet of the program selection screen except the header are supplied to and decoded by the MPEG video decoders 25-1 to 25-6 and then stored into the virtual frame memory 49.

On the other hand, video packets on which image data of ordinary programs (MPEG video data) are disposed are supplied to and decoded by the MPEG video decoder 25-1. Audio packets on which audio data (MPEG audio data) of ordinary programs or a program selection screen are disposed are all supplied to and decoded by the MPEG audio decoder 26.

While details of the processing of the encoder are disclosed in "The Technique for Supporting the Information Superhighway of the United States", Nikkei electronics, Nikkei BP, pp. 180–189 mentioned hereinabove, scheduling is performed so that the transponders may have an equal transfer rate. The transmission rate per one carrier allocated to each transponder is, for example, 40 Mbits/sec.

Where the image includes a comparatively great amount of motion as in, for example, a sports program, the MPEG video data occupies many packets. Therefore, as the number of such programs increases, the number of programs which can be transmitted by one transponder decreases. On the other hand, MPEG video data of an image which includes a comparatively small amount of motion such as a scene of an announcement of a news program can be transmitted with a comparatively small number of packets. Accordingly, as the number of programs of the type just mentioned increases, the number of programs which can be transmitted with one transponder increases.

Since the program selection screen is prepared to display a preview screen in full motion, where the receiver 2 includes a single tuner 21 as seen in FIG. 11, if packets in which the program selection screen is disposed are transmitted via a plurality of transponders, then the tuning frequency must be changed over between frequencies of different transponders. This makes it difficult to display reduced screens in full motion.

Therefore, the broadcasting station transmits the program selection screen basically via one transponder.

Where reduced screens are screens of programs of different broadcasting channels individually reduced to ⅓ in the vertical and horizontal directions as described above, it is simply considered that the amount of data of one reduced screen is ⅑ the amount of image data of an ordinary program. Accordingly, in this instance, the amount of data of a program of one broadcasting channel is equal to the amount of data of nine reduced screens, and the programs of nine broadcasting channels in the maximum can be transmitted via one transponder as described hereinabove. Consequently, when reduced screens are transmitted via one transponder, 81 (=9×9) (54 in the arrangement shown in FIG. 6) reduced screens in the maximum can be transmitted.

Consequently, when reduced screens obtained by merely reducing screens of programs of different channels to ⅓ in the vertical and horizontal directions are transmitted, the receiver 2 which includes the single tuner 21 can display only the aforementioned number of reduced screens in the maximum in full motion. Thus, several methods of displaying a greater number of reduced screens in full motion will be described below.

According to the first method, the amount of data of a reduced screen per one program is decreased on the broadcasting station side. This can be achieved by thinning out or sampling picture elements forming a reduced screen or frames or by using a rougher quantization step for MPEG coding of a reduced screen.

Thus, the amounts of data of reduced screens corresponding to programs of all channels transmitted from the broadcasting station via the artificial satellite 61 are set so that the reduced screens can be transmitted via one transponder. In this instance, since no changing over of the tuning frequency is required, a preview screen of full motion can be provided.

It is to be noted that, while, in this instance, the image of the preview screen becomes somewhat rougher or the motion of the image becomes less smooth, it is considered that, since one reduced screen is displayed as a screen of an area equal to ⅑ the area of the screen of an ordinary screen (parent screen), such some roughness of the image or the less smoothness of the motion is not very remarkable (conversely speaking, the amount of data of a reduced screen per one program is decreased to such a degree that the viewer does not feel such roughness of the image or such less smoothness of the motion).

Subsequently, according to the second method, on the broadcasting station side, reduced screens are compressed in the time base direction and the thus compressed data are transmitted, and in the receiver 2, the compressed data from the broadcasting station are received and stored as they are into the virtual frame memory 49. Then, when a preview screen is to be displayed, the compressed data is read out from the virtual frame memory 49 and decompressed in the time base direction, and then, the resultant data is outputted to the monitor apparatus 4.

In this instance, the program selection screen is transmitted via a plurality of transponders. Consequently, even if it becomes necessary for the tuner 21 to change over the tuning frequency thereof to a frequency of a different transponder, a preview screen can be displayed with decompressed reduced screens during such changing over operation (in this instance, the reduced screens are compressed in the time base direction so that reduced screens corresponding to a time required for changing over of the tuning frequency may be obtained).

Accordingly, also in this instance, a preview screen of full motion can be provided. Further, in this instance, since the amount of the data of the reduced screens are not decreased, for example, by thinning out, otherwise possible deterioration of the picture quality of the preview screen can be prevented.

Figure 22:
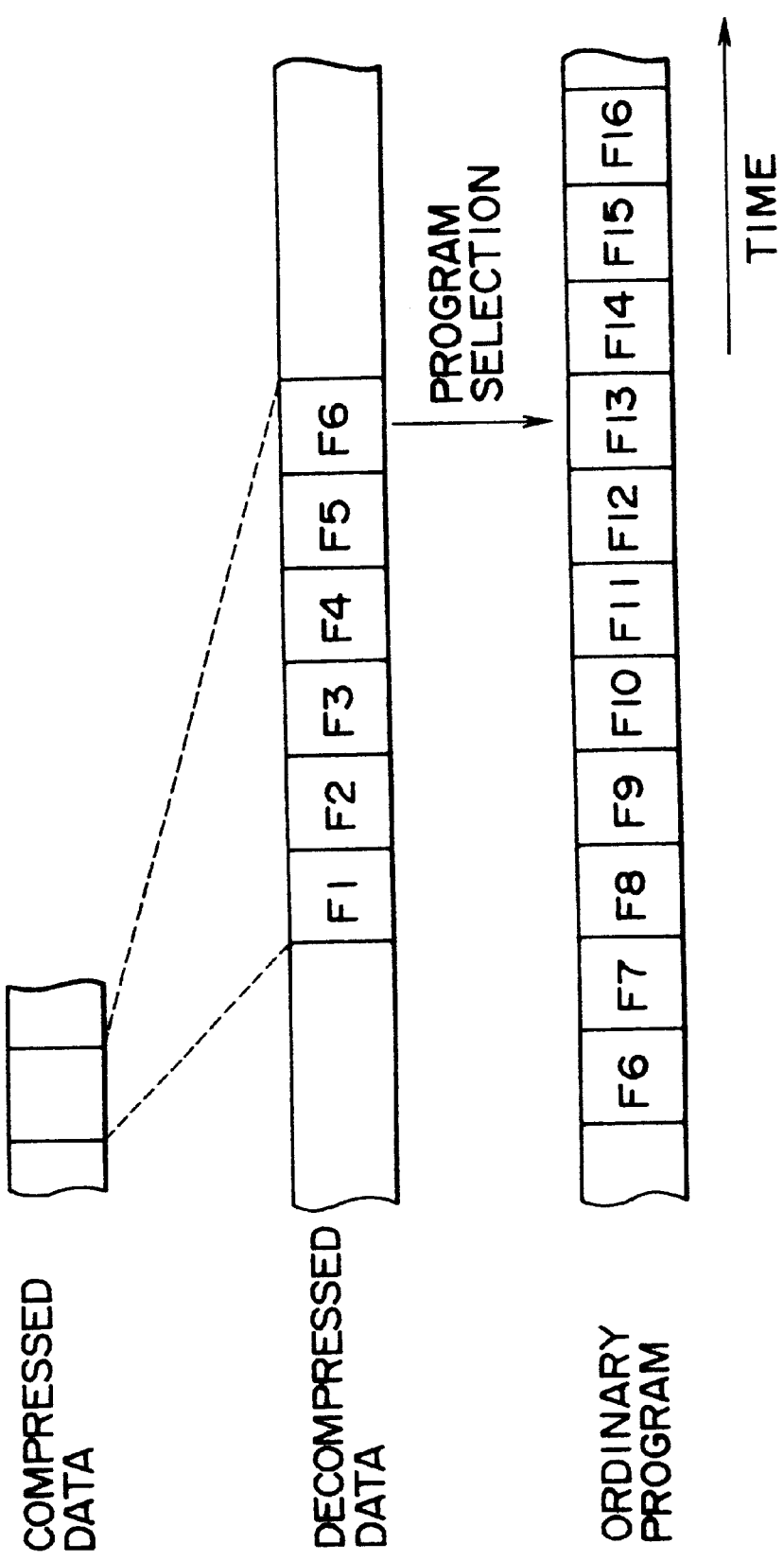
FIG. 22 is a diagrammatic view illustrating a time delay which occurs on the receiver side when archived data are transmitted in a condition compressed in the time base direction.

It is to be noted, however, that, since data obtained by decompression of compressed reduced screens are delayed from data of ordinary programs, for example, as seen in FIG. 22, if selection of a program is settled when, for example, a frame F6 of a decompressed reduced screen is displayed, then the display of the monitor apparatus 4 does not start with the frame F6 of the ordinary program but starts with a different frame F13. In this manner, the screen upon changing over from a preview screen display to an ordinary screen display exhibits some discontinuity with regard to the time. This problem, however, can be solved by transmitting data of ordinary programs and data of compressed reduced screens so that the data of the ordinary programs and data obtained by decompression of the compressed reduced screens may be synchronized with each other on the receiver 2, that is, by transmitting the ordinary programs at timings delayed from those of the compressed reduced screens.

It is to be noted that, if an ordinary program is transmitted at a timing further later than that of a compressed reduced screen, then a preview screen of the program to be broadcast after that (to be broadcast in the future) can be provided to the viewer.

According to the third method, where a program selection screen is transmitted via a plurality of transponders, the receiver 2 is provided with a number of tuners equal to the number of the transponders, and the tuners are tuned with frequencies of the corresponding ones of the transponders. In this instance, since each tuner need not change over its tuning frequency, a preview screen of full motion can be provided.

According to the fourth method, a program selection screen is transmitted with a base band. In this instance, since no tuning is required, the problem itself of changing over of the tuning frequency does not give rise. In this instance, however, for transmission of a program selection screen, a transmission medium which can transmit a signal of the base band must be used.

Subsequently, if, for example, as seen in FIG. 23, a reduced screen a is transmitted via a certain transponder T1 and also a program A corresponding to the reduced screen a is transmitted via the transponder T1, no changing over of the tuning frequency is required when the reduced screen a is selected from within a preview screen including the reduced screen a to display the program A. Consequently, changing over from the preview screen display to the display of the program A can be performed immediately.

However, if another reduced screen b is transmitted via the transponder T1 and a program B corresponding to the reduced screen b is transmitted via a transponder T2 different from the transponder T1 as seen in FIG. 23, when the reduced screen b is selected from within a preview screen including the reduced screen b to display the program B, the tuning frequency must be changed over from the frequency of the transponder T1 to the frequency of the transponder T2. Consequently, the image is interrupted during the changing over, and this makes the viewer feel disagreeable.

Therefore, when changing over from the display of a preview screen to the display of an ordinary program is performed as described above, effect processing (for example, zooming or wiping) can be performed. Where effect processing is performed, it can be prevented that the viewer feels that the image has been interrupted.

Such interruption of the image as described above occurs upon changing over from a display condition in which the ordinary program B is enjoyed to the display of a preview screen. Also in this instance, however, by performing effect processing, it can be prevented that the viewer feels that the image has interrupted.

Further, the interruption of the image in this instance can be prevented by transmitting a program selection screen, which is the same as the program selection screen to be transmitted via the transponder T1, also via the transponder T2 as indicated by broken lines in FIG. 23. This is because, upon changing over from the condition wherein the ordinary program B is enjoyed to the display of a preview screen, only it is required to display the program selection screen (reduced screens) transmitted via the transponder T2 and the tuning frequency need not be changed over.

It is to be noted that, where the same program selection screen is transmitted via all of the transponders of the artificial satellite 61, a preview screen can be displayed immediately to the frequency of whichever transponder the tuner 21 is tuned.

Even if a preview screen includes reduced screens arranged for individual program categories as described above, when the number of programs involved is very great (for example, when the number of programs is 100 or more), it is cumbersome to scroll the preview screen to find out the category of a desired program. In particular, when the preview button 143 is manually operated, if a preview screen (which may be hereinafter referred to as initial preview screen) displayed initially on the monitor apparatus 4 is, for example, 3×3 reduced screens (indicated by slanting lines in FIG. 18) at a left upper portion from among the reduced screens stored in the virtual frame memory 49 shown in FIG. 18 and the category of a desired program is allocated to a row spaced from the position, then each time it is tried to select a program of the category, a scrolling operation must be performed in order to display the row of the category on the monitor apparatus 4. This makes the viewer feel cumbersome.

Accordingly, a reduced screen of a program of a channel which is enjoyed frequently by the viewer or the row of the category of a program enjoyed frequently by the viewer is preferably included in the preview screen (initial preview screen) displayed initially.

Thus, since the array positions of reduced screens on the virtual frame memory 49 can be customized by manual operation of the remote commander 5 as described above, a method may be available wherein the viewer re-arranges reduced screens stored in the virtual frame memory 49 so that a reduced screen of a program enjoyed frequently by the viewer or a row of the category of such program may be included in the initial preview screen.

With the method, however, upon re-arrangement, the viewer must still scroll the preview screen to find out a reduced screen of a desired program.

Thus, the CPU 29 in the receiver 2 may be constructed in the following manner. In particular, the CPU 29 counts the numbers C(i) of times (each hereinafter referred to as enjoyment time number, which has the same signification as enjoyment frequency) by which the programs i (i is a variable for identification of a program) are selected and displayed on the monitor apparatus 4. Then, the CPU 29 changes the array positions of the reduced screens stored in the virtual frame memory 49 based on the thus counted enjoyment time numbers so that the reduced screens of N pieces of most frequently enjoyed programs may be displayed in the uppermost row of the initial preview screen in a descending order of the enjoyment time numbers. In other words, the CPU 29 executes processing of automatically changing the array of the reduced screens in accordance with the enjoyment program history so that the screen of a comparatively frequently enjoyed program is arranged at a position at which it can be selected comparatively readily.

It is to be noted that, when the initial preview screen is displayed, the cursor 201 (FIG. 20) is displayed, for example, at the uppermost leftmost position on the initial preview screen, and the reduced screens of N pieces of the most frequently enjoyed programs are arranged in a descending order of the enjoyment time numbers in the uppermost row of the virtual frame memory 49 beginning with the left end. Accordingly, in this instance, when it is intended to select a program which has been enjoyed most frequently, a desired program can be displayed only by performing a manual depressing operation (selection operation) of the select button 131 without the necessity of a manual directional operation of the select button 131 after the initial preview screen is displayed.

Figure 24:
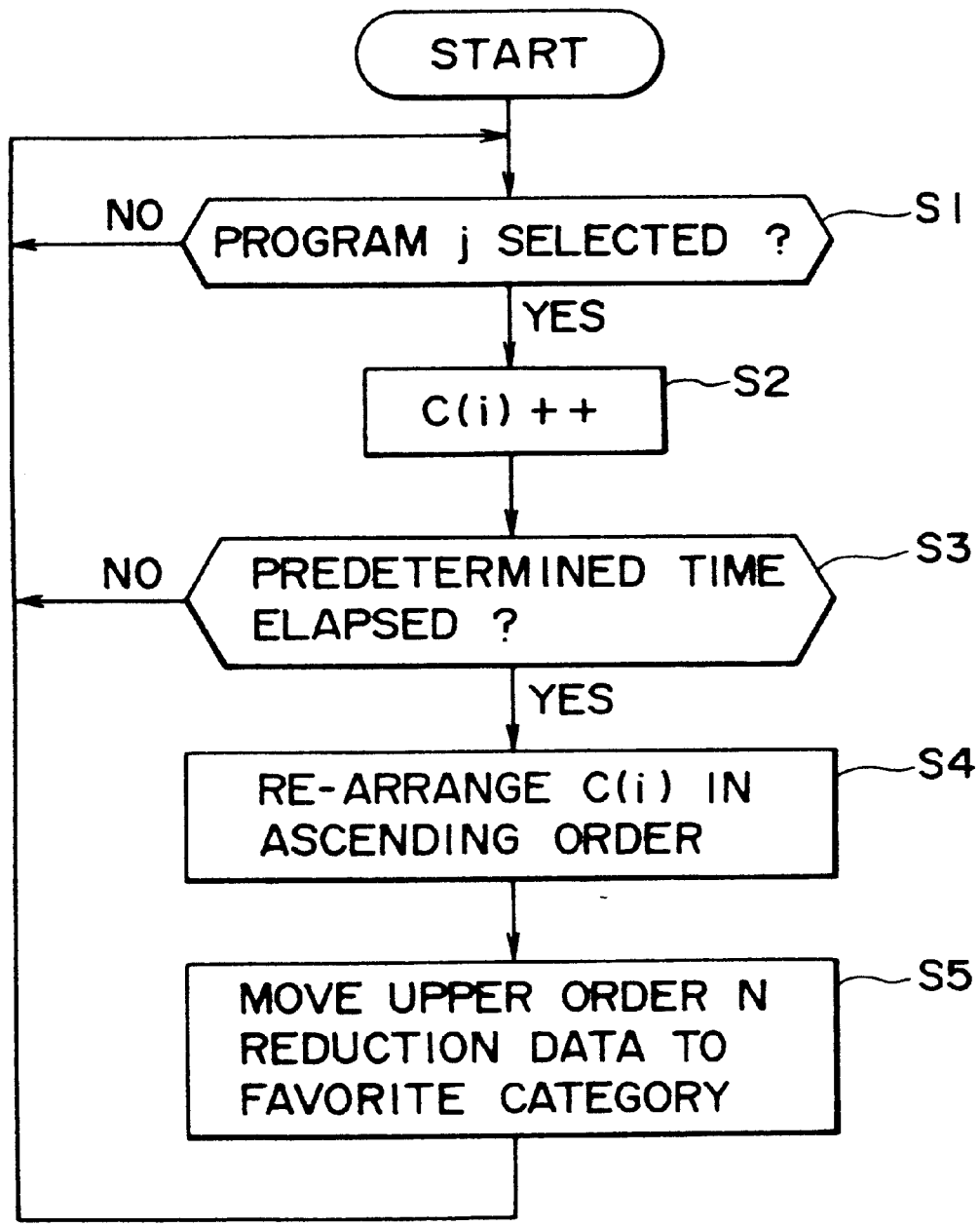
FIG. 24 is a flow chart illustrating processing of a CPU of the apparatus of FIG. 8 when the array position of a reduced screen stored in the virtual frame is to be varied.

In the following, the processing of the CPU 29 to change the array positions of the reduced screens stored in the virtual frame memory 49 will be described with reference to the flow chart of FIG. 24. It is assumed, however, that the reduced screens are stored for individual categories in the virtual frame memory 49 as described hereinabove with reference to FIG. 5. Further, it is assumed that the program category in the uppermost row of the virtual frame memory 49 is a category (which may be hereinafter referred to as a favorite category) which is enjoyed frequently by the viewer, and the reduced screens of programs which are enjoyed frequently by the viewer are arranged in the favorite category.

The CPU 29 discriminates first at step S1 whether or not a program has been selected. If it is discriminated at step S1 that no program has been selected, the control sequence returns to step S1. On the contrary, if it is discriminated at step S1 that some program has been selected, that is, when a certain program i has been selected and displayed on the monitor apparatus 4, then the control sequence advances to step S2, at which the enjoyment time number C(i) of the program i is incremented by one.

It is to be noted that the enjoyment time number C(i) is stored into the EEPROM 38.

Then, the control sequence advances to step S3, at which it is discriminated whether or not a predetermined time interval has elapsed after the last change of the array positions of reduced screens. If it is discriminated at step S3 that the predetermined time interval has not elapsed after the last change of the array positions of reduced screens, the control sequence returns to step S1 so that the processing is repeated beginning with step S1. On the contrary if it is discriminated at step S3 that the predetermined time interval has elapsed after the last change of the array positions of reduced screens, then the control sequence advances at step S4. At step S4, the enjoyment time numbers C(i) of the programs i are sorted in the ascending order (re-arranged), whereafter the control sequence advances to step S5.

At step S5, the reduced screens of programs which correspond to N pieces of upper ones of the enjoyment time numbers C(i) which have been re-arranged in the ascending order are moved so that they may be arranged in the order in the uppermost row of the virtual frame memory 49 beginning with the left end, that is, the reduced screens of programs corresponding to the N pieces of upper ones of the enjoyment time numbers C(i) are arranged in the favorite category. Thereafter, the control sequence returns to step S1. It is to be noted that the movement of reduced screens on the virtual frame memory 49 can be performed by the CPU 29 which controls the virtual frame memory 49.

Thus, for example, if a program P1 which belongs to the category of "movie" is the most frequently enjoyed program as seen in FIG. 25, then the reduced screen of the program P1 is moved to the left end of the horizontal row of the favorite category (uppermost row of the virtual frame memory 49). Then, in this instance, reduced screens which have been arranged on the right to the reduced screen of the program P1 are individually shifted by one to the left. Consequently, to the location at which the reduced screen of the program P1 has been disposed, the reduced screen which has been located next on the right side of the reduced screen of the program P1 is disposed.

Accordingly, only by retrieving the row of the favorite category, the viewer can find out a program enjoyed frequently.

It is to be noted that, while the favorite category in the foregoing description is allocated to the uppermost horizontal row of the virtual frame memory 49, the favorite category may otherwise be allocated to another horizontal row of the virtual frame memory 49.

Further, the predetermined time interval at step S3 can be set arbitrarily. However, if the predetermined time interval is set to a comparatively short period, then the array positions of reduced screens may possibly be changed frequently. In this instance, however, the viewer may rather be confused in finding out the reduced screen of a desired program. Accordingly, the predetermined time interval is preferably set to a somewhat long period (for example, to one week or one month).

Further, while the array positions of reduced screens in the foregoing description are changed each time the predetermined time interval elapses, the change of the array positions of reduced screens may otherwise be performed when the favorite button 144 is manually operated.

Further, while the reduced screens of the N pieces of most frequently enjoyed programs in the foregoing description are arranged in the descending order in the row of the favorite category beginning with the left end, also the reduced screens of the other categories may additionally be arranged for the individual categories in the ascending order of the enjoyment time numbers beginning with the left ends in the individual rows. In this instance, a program corresponding to the reduced screen at the left end in each row of the virtual frame memory 49 is the most frequently enjoyed program among the programs of the category of the row.

On the other hand, if programs of a certain category are enjoyed frequently by the viewer irrespective of the broadcasting channel and so forth, then where the reduced screens of programs of the category are arranged in the uppermost horizontal row of the virtual frame memory 49, one of the programs can be selected readily since the reduced screens of the programs of the category are displayed as the initial preview. Therefore, the CPU 29 may calculate, when it is discriminated at step S3 of FIG. 24 that the predetermined time interval has elapsed after the last change of the array positions of reduced screens, the sum of the enjoyment time numbers of programs for the individual categories, and it may change the array positions of the reduced screens in the virtual frame 35 in the ascending order of the values of the sum.

In this instance, for example, if the sum of the enjoyment time number of programs (preference degree) belonging to the category of "movie" becomes comparatively higher, then the reduced screens of the programs belonging to the category "movie" are moved to the uppermost horizontal row of the virtual frame memory 49 as seen in FIG. 26. Then, the reduced screens are moved in units of a category (in units of a row) so that they may be arranged in the descending order of the enjoyment time numbers.

Accordingly, where programs of the movie are enjoyed most frequently, when the initial preview screen is displayed, reduced screens of programs belonging to the category "movie" are displayed in the uppermost row of the screen. Consequently, the viewer can find out a desired one of programs belonging to the category "movie" readily.

It is to be noted that, also in this instance, reduced screens can be arranged, for each category, in the descending order of enjoyment time numbers in a row beginning with the left end.

Since the array positions of reduced screens are changed based on the enjoyment time numbers as described above, the viewer can find out a reduced screen of a frequently enjoyed program of a channel readily. Accordingly, the user interface upon program selection can be improved.

Figure 27:
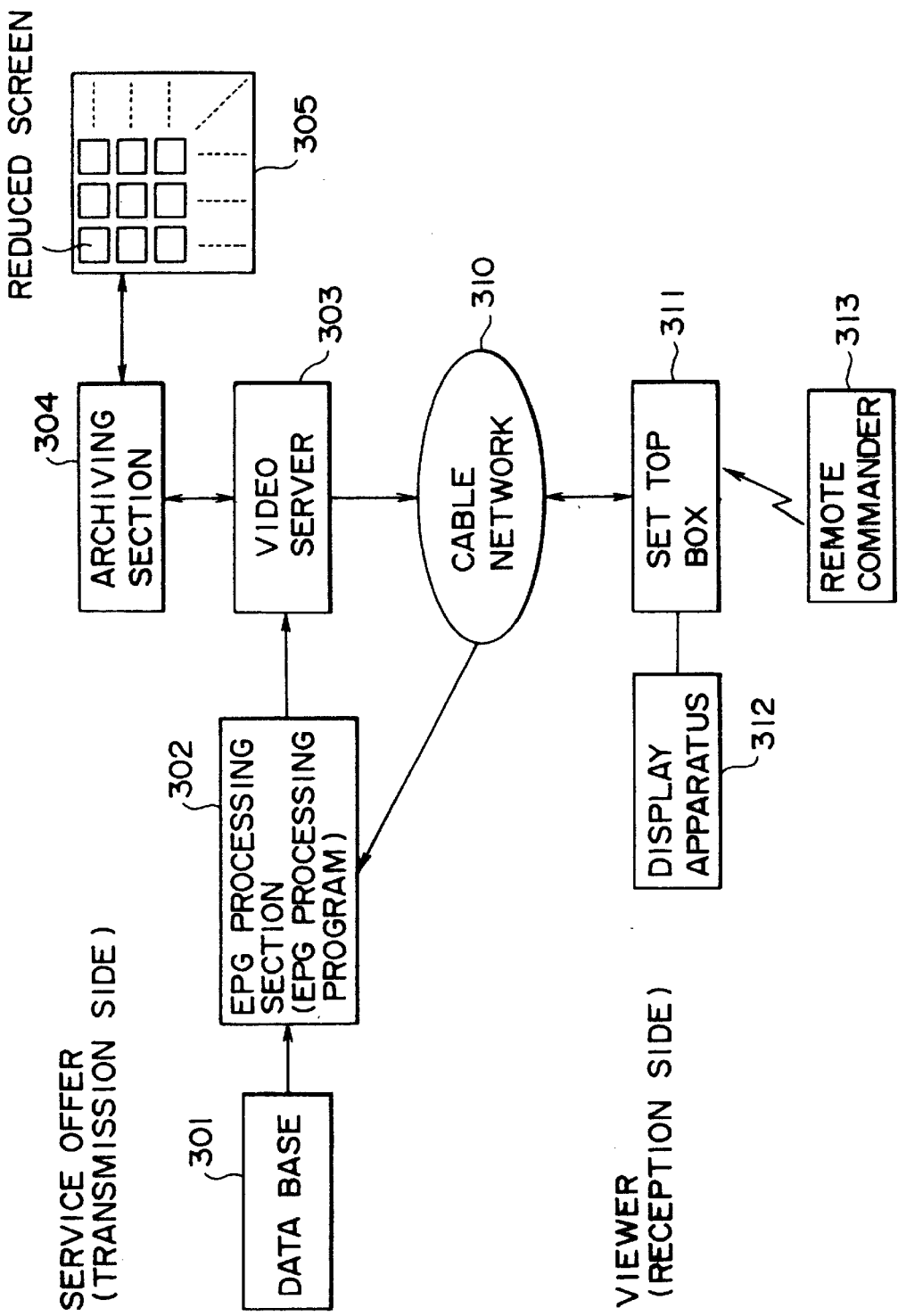
FIG. 27 is a block diagram showing a video on demand service system to which the present invention is applied.

FIG. 27 shows a construction of a video on-demand service system to which the present invention is applied.

A data base 301 of the service offerer side corresponding to the broadcasting station of FIG. 3 stores a table of corresponding relationships between program names, categories, broadcasting channels and broadcasting times of programs, IDs for identification of, for example, MPEG video data (MPEG coded video data) or MPEG audio data (MPEG coded audio data) as video data or audio data constructing the programs, and so forth. An EPG processing section 302 performs predetermined processing in accordance with a predetermined EPG processing program.

In particular, the EPG processing section 302, for example, refers to the table stored in the data base 301 to recognize a program to be broadcast at present and controls a video server 303 to transmit MPEG video data and MPEG audio data constructing the program. In this instance, the EPG processing section 302 supplies the IDs of the MPEG video data and the MPEG audio data from within the information stored in the data base 301 to the video server 303 and further supplies other necessary information to the video server 303.

Further, the EPG processing section 302 performs predetermined processing in response to a signal transmitted thereto from a set top box 311 on the viewer side via a cable network 310.

The video server 303 stores MPEG video data and MPEG audio data (both data may be hereinafter referred to collectively as MPEG data) constructing programs together with IDs of them. When an ID and other information are received from the EPG processing section 302, the video server 303 transmits MPEG data corresponding to the ID, that is, an ordinary program, to the viewer side via the cable network 310.

Meanwhile, video and audio signals (digital signals) constructing programs of broadcasting channels transmitted from the video server 303 are outputted also to an archiving section 304.

The archiving section 304 produces, for example, reduced screens (screens reduced to ⅓ in the vertical and horizontal directions from original screens similarly as those by the archiving section 52) as data for program selection of the channels representative of contents of the programs of the channels inputted thereto. The archiving section 304 supplies and stores the thus produced reduced screens to and into a storage apparatus 305 once. After reduced screens of programs of all channels are stored into the storage apparatus 305, the archiving section 304 reads out all of the reduced screens from the storage apparatus 305 and combines (archives) them into single data, that is, archived data.

It is to be noted that the archiving section 304 may convert reduced screens of programs of a plurality of channels as they are into archived data or may convert, similarly to the archiving section 52, reduced screens of programs of a plurality of channels into archived data after they are arranged into a predetermined array condition, for example, such that they are classified for individual categories of programs and arranged in a matrix. Further, the archiving section 304 may include links between reduced screens and programs corresponding to the reduced screens.

The archived data is supplied to the video server 303, and when a request for a preview is received, the archived data is transmitted to the viewer side using a predetermined dedicated transmission channel via the cable network 310.

On the viewer side, data transmitted thereto from the service offerer via the cable network 310 (programs of a plurality of channels and archived data) is received by the set top box 311. The set top box 311 performs necessary processing for the received data, and a video signal is supplied to and displayed on a display apparatus 312 which may be, for example, a television receiver while an audio signal is supplied to and outputted as sound from a loud-speaker (not shown).

In particular, when a particular broadcasting channel is selected by the set top box 311, a program of the broadcasting channel is displayed on the display apparatus 312. On the other hand, when archived data are selected by the set top box 311, those reduced screens of programs of a predetermined number of channels (nine channels also in the present embodiment similarly as in the case of the broadcasting system of FIG. 3) are displayed at a time on the display apparatus 312. In other words, a preview screen is displayed.

It is to be noted that the set top box 311 is constructed so that it can perform predetermined processing by a manual operation of a remote commander 313. Further, the set top box 311 includes an operation panel (not shown) so that similar processing to that performed when the remote commander 313 is manually operated may be performed by a manual operation of the operation panel. The remote commander 313 includes, from among the buttons and switches of the remote commander 5 shown in FIG. 12, a select button 131, a preview button 143 and other necessary buttons and switches.

Figure 28:
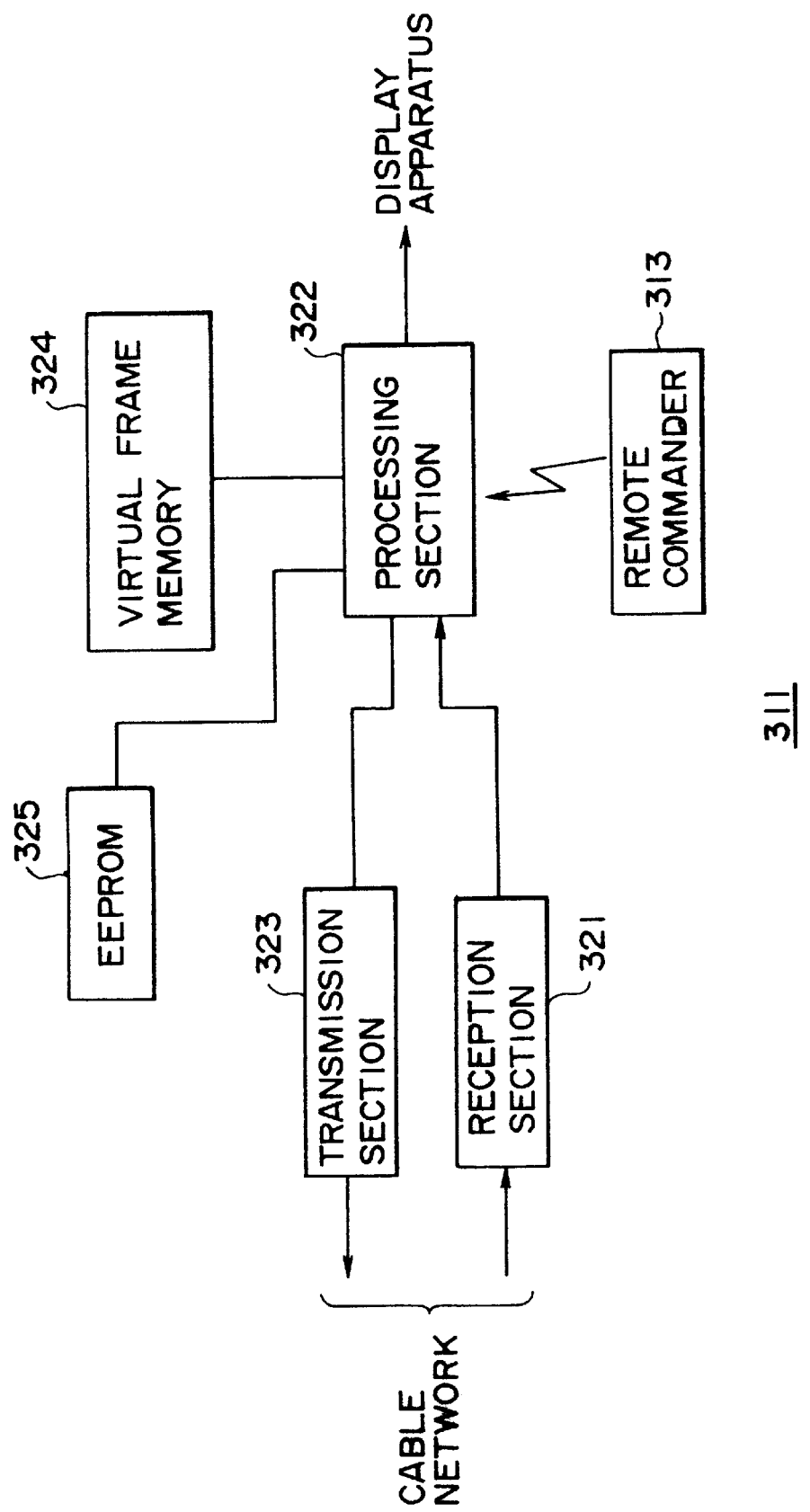
FIG. 28 is a block diagram showing a more detailed construction of a set top box shown in FIG. 27.

FIG. 28 shows an example of a detailed construction of the set top box 311. Referring to FIG. 28, the set top box 311 includes a reception section 321, a processing section 322, a transmission section 323, a data buffer memory 324 and an EEPROM 325. The reception section 321 receives a signal transmitted thereto via the cable network 310 and outputs the received signal to the processing section 322. The processing section 322 controls the reception section 321 to output a signal of a predetermined channel. Then, when the signal supplied from the reception section 321 is data of an ordinary program, the processing section 322 supplies the signal to the display apparatus 312 so that it may be displayed on the display apparatus 312 (it is to be noted that sound is outputted from the loudspeaker not shown).

On the other hand, when the signal supplied from the reception section 321 (which includes, similarly to the reception section shown in FIG. 16, a tuner, six MPEG video decoders, and an MPEG audio decoder built therein) is archived data, the processing section 322 separates the archived data into reduced screens and supplies and stores the reduced screens to and into the data buffer memory 324 which corresponds to the virtual frame memory 49 of FIG. 11.

The data buffer memory 324 stores the reduced screens in an array of a matrix similarly as in the virtual frame memory 49 described hereinabove with reference to FIG. 18. Then, also in this instance, the reduced screens may be arranged, for example, for individual program categories or in a manner of arrangement (in an order of array) desired by the viewer. Further, when the array positions of reduced screens are changed or when reduced screens are received in a predetermined array condition from the service offerer side, the reduced screens may be stored in the array condition into the data buffer memory 324.

It is to be noted that a manner of arrangement desired by the viewer can be set by a manual operation of the remote commander 313, and the thus set arrangement manner is stored into the EEPROM 325. When some arrangement manner is set in the EEPROM 325, the processing section 322 stores reduced screens in accordance with the arrangement manner into the data buffer memory 324.

After reduced screens are stored into the data buffer memory 324, 3×3 reduced screens from among the reduced screens which are included in a range displayed at a time on one screen of the display apparatus 312 are read out by the processing section 322. Then, the 3×3 reduced screens are supplied from the processing section 322 to and displayed on the display apparatus 312. In other words, a preview screen is displayed on the display apparatus 312.

In this instance, the display apparatus 312 displays, together with the 3×3 reduced screens of the preview screen, a cursor 201 in the form of a frame which surrounds one of the reduced screens in a superimposed condition on the screen thereof.

Then, the preview screen is scrolled in a similar manner as described hereinabove as the range of reduced screens to be read out from the data buffer memory 324 is changed by the processing section 322 in response to a manual operation of the remote commander 313. Accordingly, also in this instance, even if a number of reduced screens (child screens) greater than the number of reduced screens which can be displayed at a time are received, the viewer can observe all of the reduced screens by manual operation of the remote commander 313.

One of the reduced screens displayed on the display apparatus 312 can be selected by manually operating the remote commander 313 to move the cursor 201. If a reduced screen corresponding to a program desired by the viewer is selected, then the processing section 322 delivers an instruction to the reception section 321 to receive and output a program corresponding to the reduced screen (a program (parent screen) linked to the reduced screen). Consequently, data of the ordinary program are outputted from the reception section 321. The processing section 322 decodes the data outputted from the reception section 321, that is, MPEG data, and supplies the decoded data to the display apparatus 312 so that they may be displayed on the display apparatus 312.

It is to be noted that data for program selection (in the present embodiment, a reduced screen) of a program which is not broadcast at present (for example, a program which is broadcast when requested) are sometimes transmitted, for example, for propagation of the program, from the service offerer side. When such data for program selection are received, the processing section 322 controls the transmission section 323 to develop a request for transmission of the data for program selection (which may be hereinafter referred to as program selection request) (it is to be noted that the processing section 322 is constructed so that information to be transmitted is notified to the service offerer side from the transmission section 323. The information thus transmitted is received by the EPG processing section 302 via the cable network 310.

The program selection request is received by the EPG processing section 302 via the cable network 310. Upon reception of the program selection request, the EPG processing section 302 controls the video server 303 to transmit a program corresponding to the program selection request. The video server 303 starts transmission of the program under the control of the EPG processing section 302. Consequently, the viewer can enjoy the program requested (selected) by the viewer.

In such a case, if the video server 303 is controlled to transmit the program after the program selection request is received by the EPG processing section 302, much time is required before the viewer actually enjoys the program, which may make the viewer disagreeable. Therefore, the processing section 322 transmits recognition information for recognition of a reduced screen at which the cursor 201 is positioned from the transmission section 323 to the EPG processing section 302 so that the EPG processing section 302 may recognize the reduced screen of which program the viewer tries to select now. In this instance, the EPG processing section 302 recognizes the reduced screen at which the data base 301 is positioned from the recognition information and controls the video server 303 to make preparations for transmission of data of a program corresponding to the reduced screen. Consequently, when the reduced screen is selected actually, the program corresponding to the reduced screen can be transmitted immediately.

Further, in this instance, the EPG processing section 302 can control the video server 303 to transmit an audio signal of the program corresponding to the recognition information. In this instance, the video server 303 transmits an audio signal instructed from the EPG processing section 302 to the viewer side via the cable network 310. On the viewer side, the audio signal is received by the reception section 321 and outputted as sound from the loudspeaker via the processing section 322. Accordingly, in this instance, the viewer can listen to the sound of the program corresponding to the reduced screen at which the cursor 201 is positioned.

Subsequently, operation of the apparatus on the service offerer side and operation of the set top box 311 on the viewer side will be described in more detail with reference to FIGS. 29 and 30, respectively. It is to be noted that it is assumed that reduced screens are stored in the data buffer memory 324 in a predetermined array condition determined by the service offerer side.

Figure 29:
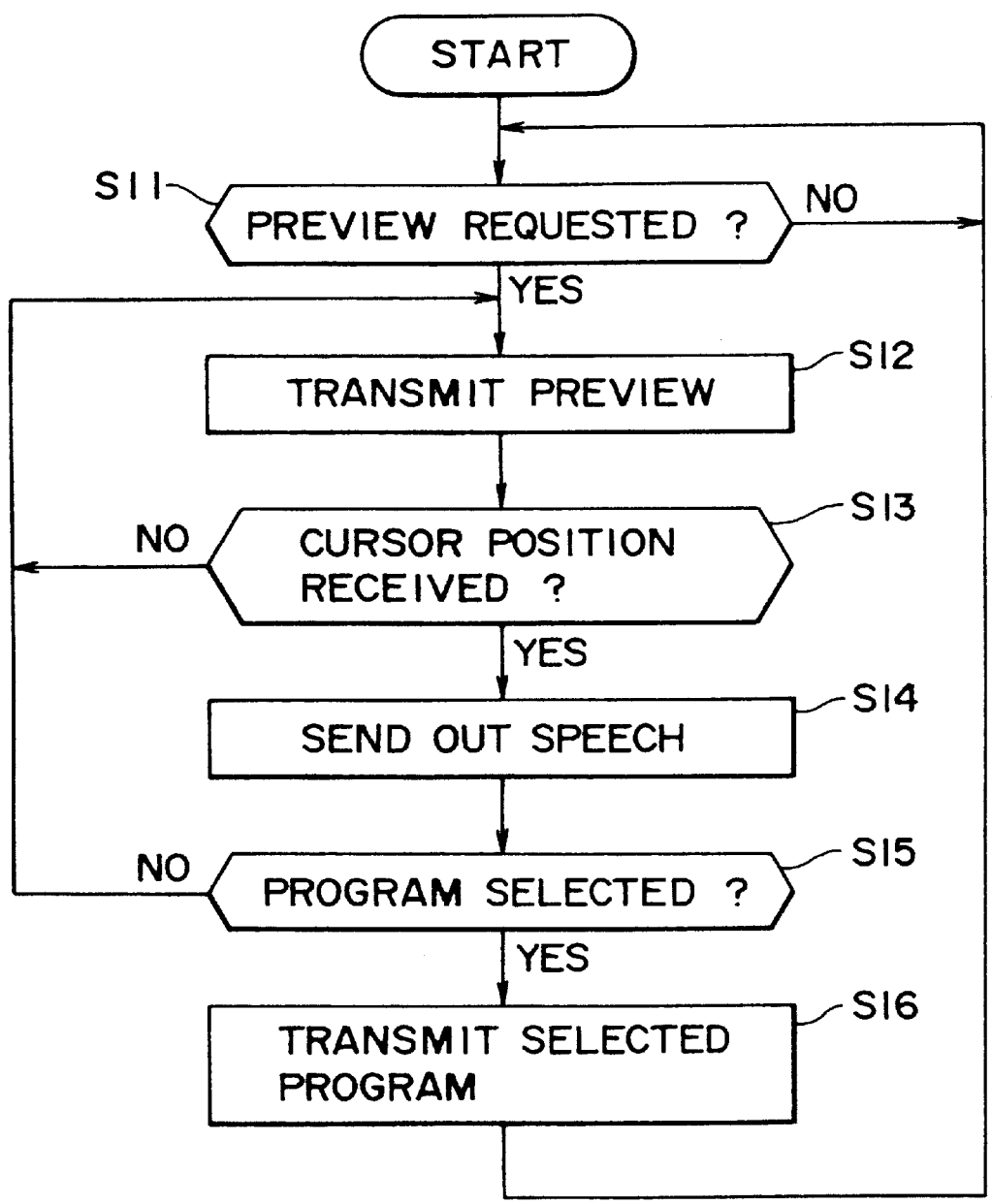
FIG. 29 is a flow chart illustrating operation of a service offerer side apparatus shown in FIG. 27.

Referring first to FIG. 29, on the service offerer side, it is discriminated first at step S11 by the EPG processing section 302 whether or not a preview request has been received from the set top box 311. Here, the preview request is transmitted thereto from the set top box 311 as the remote commander 313 is manually operated to develop an instruction to display a preview screen as hereinafter described (step S22 of FIG. 30).

If it is discriminated at step S11 that no preview request has been received, the control sequence returns to step S11. On the contrary if it is discriminated at step S11 that a preview request has been received, then the control sequence advances to step S12, at which preview transmission processing is executed. In particular, the archiving section 304 transmits archived data to the set top box 311 via the cable network 310.

Then, the control sequence advances to step S13, at which it is discriminated by the EPG processing section 302 whether or not the position of the curser (cursor position information) transmitted from the set top box 311 has been received. Here, the cursor position information is information representative of the position of the cursor 201 and is transmitted from the set top box 311 as hereinafter described (step S24 of FIG. 30).

If it is discriminated at step S13 that no cursor position information has been received, the control sequence returns to step S13. On the contrary if it is discriminated at step S13 that cursor position information has been received, then the EPG processing section 302 recognizes the position of the cursor 201 based on the received cursor position information and controls the video server 303 so that an audio signal of a program corresponding to a reduced screen displayed at the position of the cursor 201 may be transmitted. Consequently, the audio signal is received by the video server 303 at step S14. Then, the control sequence advances to step S15, at which it is discriminated by the EPG processing section 302 whether or not a program selection request has been received from the set top box 311.

If it is discriminated at step S15 that no program selection request has been received, the control sequence returns to step S12. On the contrary if it is discriminated at step S15 that a program selection request has been received, then the EPG processing section 302 controls the video server 303 to transmit a program corresponding to the program selection request. Consequently, a program selected by the viewer side is transmitted from the video server 303 at step S16. After the transmission is completed, the control sequence returns to step S11.

It is to be noted that the cursor position information includes information of which ones of the reduced screens stored in the data buffer memory 324 are currently displayed on the display apparatus 312 (and may include, when necessary, some other information such as information of in which direction the remote commander 313 is manually operated to scroll the preview screen). The EPG processing section 302 recognizes a reduced screen at which the cursor 201 is positioned from the reduced screens currently displayed on the display apparatus 312.

Figure 30:
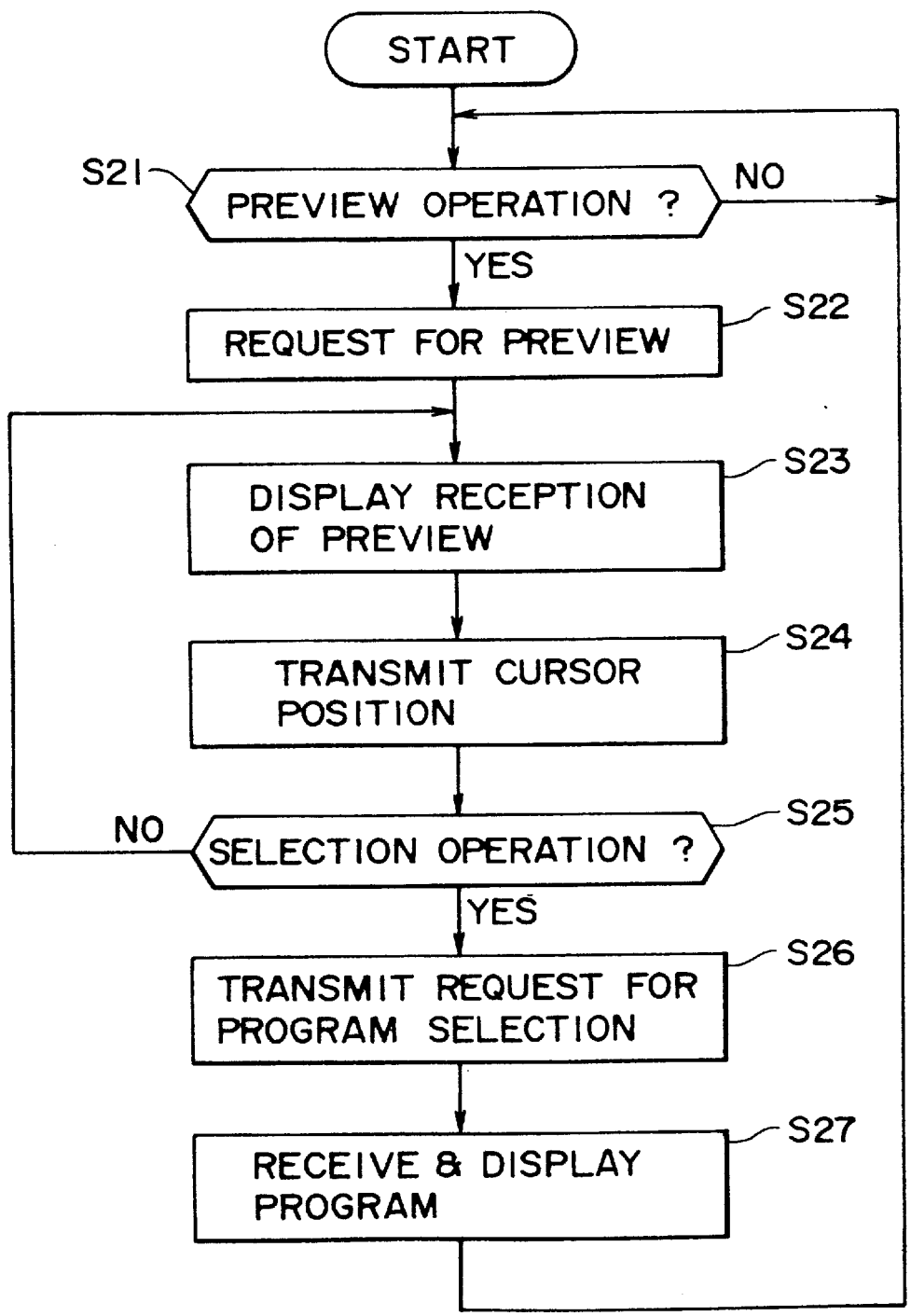
FIG. 30 is a flow chart illustrating operation of the set top box of FIG. 28.

On the other hand, in the set top box 311, it is discriminated by the processing section 322 first at step S21 of FIG. 30 whether or not the remote commander 313 has been manually operated to develop an instruction to display a preview screen. If it is discriminated at step S21 that the remote commander 313 has not been manually operated to develop an instruction to display a preview screen, the control sequence returns to step S21. On the contrary if it is discriminated at step S21 that the remote commander 313 has been manually operated, then the control sequence advances to step S22, at which a preview request is transmitted to the EPG processing section 302. The video server 303 transmits archived data to the set top box 311 in response to the request (step S12 of FIG. 29).

Thereafter, the control sequence advances to step S23, at which those of the reduced screens stored in the data buffer memory 324 which are included in a predetermined range are read out by the processing section 322 and outputted to the display apparatus 312. Consequently, a preview screen is displayed on the display apparatus 312.

It is to be noted that, in this instance, if an audio signal is transmitted from the service offerer side at step S14 described hereinabove, then corresponding sound is outputted from the loudspeaker while the preview is displayed.

Thereafter, the control sequence advances to step S24, at which the position of the cursor 201 displayed on the display apparatus 312 and other necessary information are recognized by the processing section 322 and are transmitted as cursor position information to the EPG processing section 302. Then, the control sequence advances to step S25, at which it is discriminated by the processing section 322 whether or not the remote commander 313 has been manually operated (selection operation) so as to select the reduced screen at which the cursor 201 is currently positioned. If it is discriminated at step S25 that the remote commander 313 has not been manually operated to select the reduced screen, the control sequence returns to step S23. On the contrary if it is discriminated at step S25 that the remote commander 313 has been manually operated to select the reduced screen, then the control sequence advances to step S26, at which a signal (program selection request) requesting a program corresponding to the selected reduced screen is transmitted to the EPG processing section 302 by the processing section 322.

As a result, the program transmitted at step S16 described above is received at step S27 and then supplied to and displayed on the display apparatus 312, whereafter the control sequence returns to step S21.

It is to be noted that, while, in the present embodiment, 3×3 reduced screens are displayed at a time on the monitor apparatus 4 in order to allow selection of a program, the number of reduced screens to be displayed at a time on the monitor apparatus 4 (this similarly applies to the display apparatus 312) is not limited to the specific number. In particular, for example, 4×4 reduced screens or 3×2 reduced screens can be displayed at a time on the monitor apparatus 4 based on, for example, the resolution of the monitor apparatus 4 or some other parameter (however, the size of one reduced screen must be even at the smallest such that, when observing the reduced screen, the viewer can understand contents of the program).

Further, while, in the present embodiment, reduced screens are arranged in a matrix on the virtual frame memory 49, it is otherwise possible, for example, to store reduced screens into a predetermined storage area and store addresses, at which the reduced screens are stored, in a matrix in the virtual frame memory 49 (this similarly applies to the data buffer memory 324). In this instance, an address stored in the virtual frame memory 49 may be referred to read out a reduced screen stored at the address and display the reduced screen.

Further, while the receiver 2 and the monitor apparatus 4 in the present embodiment are constructed as independent apparatus of each other, the receiver 2 and the monitor apparatus 4 may otherwise be formed as a unitary member (this similarly applies to the set top box 311 and the display apparatus 312).

Further, while, in the present embodiment, reduced screens are arranged, upon arrangement for individual categories, such that reduced screens of the same category are arranged in a horizontal row, reduced screens of the same category may otherwise be arranged in a vertical column.

Further, while, in the present embodiment, data for program selection to be transmitted are reduced screens of moving pictures obtained by reduction of screens of ordinary programs, still pictures or text data representative of contents of programs may alternatively be used as the data for program selection.

Further, while, in the present embodiment, data for program selection is transmitted, such data for program selection may alternatively be produced, for example, on the viewer side. In particular, it is possible to produce, on the viewer side, reduced screens or some other data representative of the contents of programs from ordinary programs received and use them as data for program selection.

Further, while, in the present embodiment, the screen is scrolled so that all data for program selection may be observed, it is otherwise possible to change over the screen, for example, in a page turning manner so that all data for program selection may be observed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalence of the claims are therefore intended to be embraced therein.

What is claimed is:

1. A reception apparatus for receiving a program selection screen for selection of a plurality of programs of different broadcasting channels, comprising:

reception means for receiving a plurality of program selection screens, wherein each one of said plurality of program selection screens has arranged thereon a plurality of reduced screens corresponding to said plurality of programs of different broadcasting channels;

display means;

storage means for storing said plurality of program selection screens received by said reception means, said storage means arranging said plurality of program selection screens on a virtual screen such that said virtual screen has a greater number of reduced screens arranged thereon than can be displayed simultaneously on said display means;

designation means for allowing a user to scroll relative to said virtual screen in order to selectively designate for display on said display means an array of reduced screens forming a portion of said virtual screen of said storage means, said designation means enabling said user to scroll left, right, up, and/or down to regions of said virtual screen not presently being displayed to said user; and outputting means for reading out and outputting to said display means said selectively designated array of reduced screens from said virtual screen of said storage means.

2. The reception apparatus according to claim 1, wherein said reception means receives said plurality of program selection screens from one transmission channel.

3. The reception apparatus according to claim 1, further comprising array control means for controlling a scrolling operation of said designation means for selectively scrolling through said plurality of reduced screens located at various positions on said virtual screen in order to designate said array to be displayed.

4. The reception apparatus according to claim 3, wherein said array control means reads out said array of reduced screens from said virtual screen of said storage means after arranging said plurality of reduced screens into individual program categories.

5. The reception apparatus according to claim 3, further comprising array designation means for designating a plurality of array positions in said storage means for a plurality of arrays of reduced screens when said plurality of reduced screens are stored in said storage means.

6. The reception apparatus according to claim 5, further comprising changing means for changing said plurality of array positions of said plurality of arrays of reduced screens stored in said storage means.

7. The reception apparatus according to claim 6, wherein said changing means changes said plurality of array positions of said plurality of arrays of reduced screens stored in said storage means in accordance with an enjoyment history of programs watched by a viewer.

8. A reception method for receiving a program selection screen for selection of a plurality of programs of different broadcasting channels, comprising the steps of:

receiving a plurality of program selection screens, wherein each one of said plurality of program selection screens has arranged thereon a plurality of reduced screens corresponding to said plurality of programs of different broadcasting channels;

storing said received plurality of program selection screens such that said received plurality of program selection screens are arranged on a virtual screen such that said virtual screen has a greater number of reduced screens arranged thereon than can be displayed simultaneously on a display device;

scrolling left, right, up, and/or down relative to said virtual screen in order to access regions of said virtual screen not presently being displayed to a user;

selectively designating for display an array of reduced screens from said virtual screen;

reading out and outputting to said display device said designated array of reduced screens from said virtual screen; and displaying said designated array of reduced screens from said virtual screen on said display device.

9. A broadcasting system wherein a program selection screen for selection of a plurality of programs of different broadcasting channels is transmitted from a transmission apparatus and received by a reception apparatus, comprising:

transmission means provided in said transmission apparatus for multiplexing and transmitting a plurality of program selection screens, wherein each one of said plurality of program selection screens has arranged thereon a plurality of reduced screens corresponding to said plurality of programs of different broadcasting channels;

reception means provided in said reception apparatus for receiving said plurality of program selection screens;

storage means provided in said reception apparatus for storing said plurality of program selection screens received by said reception means, said storage means arranging said plurality of program selection screens on a virtual screen such that said virtual screen has a greater number of reduced screens arranged thereon than can be displayed simultaneously on a display device;

designation means cooperating with said reception means for allowing a user to scroll left, right, up, and/or down relative to said virtual screen in order to selectively designate for display on said display device an array of reduced screens forming a portion of said virtual screen of said storage means, said designation means enabling said user to scroll to regions of said virtual screen not presently being displayed to said user; and outputting means provided in said reception means for reading out and outputting to said display device said selectively designated array of reduced screens from said virtual screen of said storage means.

10. A broadcasting method wherein a program selection screen for selection of a plurality of programs of different broadcasting channels is transmitted from a transmission apparatus and received by a reception apparatus, comprising the steps of:

multiplexing and transmitting, using said transmission apparatus, a plurality of program selection screens, wherein each one of said plurality of program selection screens has arranged thereon a plurality of reduced screens corresponding to said plurality of programs of different broadcasting channels;

receiving, using said reception apparatus, said plurality of program selection screens;

storing in said reception apparatus said received plurality of program selection screens in such a way that said plurality of program selection screens are arranged on a virtual screen such that said virtual screen has a greater number of reduced screens arranged thereon than can be displayed simultaneously on a display device;

scrolling relative to said virtual screen using a designation apparatus cooperating with said reception apparatus, said scrolling enabling a user to scroll left, right, up, and/or down to access regions of said virtual screen not presently being displayed to said user;

selectively designating for display an array of reduced screens from said virtual screen; and reading out and outputting to said display device, using said reception apparatus, said selectively designated array of reduced screens from said virtual screen.

* * * * *